US012160635B2

(12) United States Patent
Doken et al.

(10) Patent No.: US 12,160,635 B2
(45) Date of Patent: Dec. 3, 2024

(54) SYSTEMS AND METHODS FOR CONTROLLING MEDIA CONTENT BASED ON USER PRESENCE

(71) Applicant: Adeia Guides Inc., San Jose, CA (US)

(72) Inventors: Serhad Doken, Bryn Mawr, PA (US); Reda Harb, Tampa, FL (US)

(73) Assignee: Adeia Guides Inc., San Jose, CA (US)

( * ) Notice: Subject to any disclaimer, the term of this patent is extended or adjusted under 35 U.S.C. 154(b) by 0 days.

(21) Appl. No.: 18/368,466

(22) Filed: Sep. 14, 2023

(65) Prior Publication Data

US 2024/0114203 A1 Apr. 4, 2024

Related U.S. Application Data

(63) Continuation of application No. 17/481,931, filed on Sep. 22, 2021, now Pat. No. 11,800,187.

(51) Int. Cl.
| | | |
|---|---|---|
| *H04N 21/442* | (2011.01) | |
| *H04N 21/436* | (2011.01) | |
| *H04N 21/4363* | (2011.01) | |
| *H04N 21/45* | (2011.01) | |
| *H04N 21/6377* | (2011.01) | |

(52) U.S. Cl.
CPC .  *H04N 21/44218* (2013.01); *H04N 21/43615* (2013.01); *H04N 21/43637* (2013.01); *H04N 21/4532* (2013.01); *H04N 21/6377* (2013.01)

(58) Field of Classification Search
CPC ....... H04N 21/44218; H04N 21/43615; H04N 21/43637; H04N 21/4532; H04N 21/6377
See application file for complete search history.

(56) References Cited

U.S. PATENT DOCUMENTS

| | | |
|---|---|---|
| 9,510,047 B2 | 11/2016 | Arai et al. |
| 10,142,674 B2 | 11/2018 | Dharwa et al. |
| 10,154,319 B1 | 12/2018 | Ramakrishnan et al. |
| 10,205,988 B1 | 2/2019 | Waterman et al. |
| 10,291,958 B2 | 5/2019 | Matthews et al. |
| 10,571,991 B2 | 2/2020 | Sprenger et al. |
| 10,631,066 B2 | 4/2020 | Shimy et al. |
| 10,848,828 B2 | 11/2020 | Panchaksharaiah et al. |
| 11,044,525 B2 | 6/2021 | Armaly |

(Continued)

OTHER PUBLICATIONS

International Search Report and Written Opinion of PCT/US2022/076751 dated Jan. 25, 2023.

(Continued)

*Primary Examiner* — Fernando Alcon
(74) *Attorney, Agent, or Firm* — Haley Guiliano LLP

(57) ABSTRACT

Systems and methods are described for controlling media content based on user presence information. A user interaction with playing of a first media asset generated for presentation at a consumption device may be identified, and in response, historical wireless signal characteristics of a wireless network, over which wireless signals are used to generate for display the first media asset, may be determined. While a second media asset is generated for display, the second media asset at the consumption device may be modified based on user presence information determined by comparing current wireless signal characteristics of the wireless network to the historical wireless signal characteristics of the wireless network.

20 Claims, 17 Drawing Sheets

(56) References Cited

U.S. PATENT DOCUMENTS

| | | |
|---|---|---|
| 11,076,183 B2 | 7/2021 | Matthews |
| 2005/0028191 A1* | 2/2005 | Sullivan ............... H04N 21/454 |
| | | 348/461 |
| 2007/0033607 A1 | 2/2007 | Bryan |
| 2007/0061851 A1 | 3/2007 | Deshpande et al. |
| 2009/0146779 A1 | 6/2009 | Kumar et al. |
| 2010/0054275 A1 | 3/2010 | Noonan et al. |
| 2011/0150426 A1* | 6/2011 | Shintani ............... H04N 21/812 |
| | | 386/250 |
| 2012/0060176 A1 | 3/2012 | Chai et al. |
| 2012/0162537 A1 | 6/2012 | Maddali et al. |
| 2013/0179698 A1 | 7/2013 | Woods et al. |
| 2013/0217499 A1 | 8/2013 | Ramaswamy et al. |
| 2014/0040931 A1 | 2/2014 | Gates et al. |
| 2014/0181910 A1 | 6/2014 | Fingal et al. |
| 2014/0245358 A1 | 8/2014 | Kumar et al. |
| 2015/0043385 A1 | 2/2015 | Noh et al. |
| 2015/0061895 A1 | 3/2015 | Ricci |
| 2017/0180935 A1 | 6/2017 | Kang |
| 2017/0187811 A1 | 6/2017 | Thomée |
| 2017/0272818 A1 | 9/2017 | Gattis et al. |
| 2017/0289596 A1 | 10/2017 | Krasadakis et al. |
| 2018/0288115 A1 | 10/2018 | Asnis et al. |
| 2019/0101632 A1 | 4/2019 | Ebido et al. |
| 2019/0182628 A1 | 6/2019 | Gulo et al. |
| 2019/0215562 A1 | 7/2019 | Scavo et al. |
| 2019/0332162 A1 | 10/2019 | Sprenger et al. |
| 2020/0056891 A1 | 2/2020 | Clausen |
| 2020/0064456 A1 | 2/2020 | Xu et al. |
| 2020/0077136 A1 | 3/2020 | Kwatra et al. |
| 2020/0336176 A1 | 10/2020 | Seok et al. |
| 2020/0413147 A1 | 12/2020 | Gupta et al. |
| 2021/0099829 A1* | 4/2021 | Soto ................... H04N 21/4122 |
| 2021/0218571 A1 | 7/2021 | Ansari et al. |
| 2021/0250639 A1 | 8/2021 | Gupta et al. |
| 2021/0281913 A1 | 9/2021 | Armaly |
| 2021/0360317 A1 | 11/2021 | Neerbek et al. |
| 2023/0087963 A1 | 3/2023 | Doken et al. |
| 2023/0091437 A1 | 3/2023 | Doken et al. |
| 2024/0056633 A1* | 2/2024 | Garner ............... H04N 21/2187 |

OTHER PUBLICATIONS

Ma Yongsen, et al., "ACM Computer Survey, vol. 52, No. 3, Article 46", WiFi Sensing with Channel State Information: a Survey, Jun. 2019.

Mrazovac, et al., Reaching the Next Level of Indoor Human Presence Detection: an RF Based Solution, 2003.

Nirmal, et al., Nirmal et al., "Deep Learning for Radio-Based Human Sensing: Recent Advances and Future Directions," IEEE Communications Surveys & Tutorials, IEEE, USA, vol. 23, No. 2, Feb. 12, 2021 (Feb. 12, 2021), pp. 999-1019.

* cited by examiner

SYSTEMS AND METHODS FOR CONTROLLING MEDIA CONTENT BASED ON USER PRESENCE

CROSS REFERENCE TO RELATED APPLICATION

This application is a continuation of U.S. patent application Ser. No. 17/481,931, filed Sep. 22, 2021, the disclosure of which is hereby incorporated by reference herein in its entirety.

BACKGROUND

This disclosure is directed to systems and methods for controlling media content based on user presence information, and selectively providing data to service providers. In particular, techniques are disclosed for modifying presentation of a media asset at a consumption device based on the user presence information, and techniques are disclosed for transmitting wireless signal characteristics to a service provider based on an authorization level of the service provider.

SUMMARY

Ubiquitous Internet connectivity has enabled modern media distribution systems to provide users access to more media content than ever before. Content providers often provide media to users via network-connected devices within homes of users. Most residential households are served by cable or fiber connections as backhaul and connectivity coverage, and distribution is achieved by Wi-Fi distribution. Wi-Fi connected devices (e.g., mobile phones, connected TVs) may communicate with a Wi-Fi router and/or access point to transmit and receive data.

It may be useful to utilize Wi-Fi information to track human presence and adjust behavior of one or more Wi-Fi connected devices on the basis of such Wi-Fi information. As an example, while content is being provided to, e.g., a television positioned in a particular room, consumers often move into another room or another floor of the home for a variety of reasons (e.g., to perform chores, in response to a package delivery, to retrieve food, etc.) and may forget to pause the content during this activity, or may underestimate the duration of the activity and intentionally decide not to pause the content. In such a circumstance, the content continues to play even if the user is not consuming the content, which is undesirable for a number of reasons. For example, users may lose track of their position in the content and may have to rewind the content for an unspecified amount of time to find the position they left off at. As another example, content providers may be burdened by consuming energy and wasting bandwidth on transmitting content that is not being consumed. In addition, the home network of the user may unnecessarily consume energy, and other services (e.g., video conferencing sessions) may be negatively affected due to the bandwidth wasted by, and throughput shared with, the unwatched content session. Moreover, due to the absence of the user in the room to consume content, the content provider may expend computing and networking resources to generate and transmit supplemental content without any benefit to the content provider or the user.

In one approach, for sessions that have been going on for a relatively long time, a content provider may pause videos when no user interaction has been received, and may prompt a user to confirm that he or she is still watching the content. However, responding to this prompt may be frustrating for a user who has been consuming the content all along and/or is unable to answer the prompt in time (e.g., if there is a countdown, and the user cannot locate the remote for the television). In another approach, a camera may be employed to monitor whether a user is viewing content at a device. However, capturing images of a user viewing content may raise privacy concerns and the user may not want such cameras to be present in his or her home.

In addition, many Wi-Fi connected devices are associated with service providers that provide certain services in a home of a user, and such service providers aim to provide better services by monitoring user data and/or an area surrounding the device. For example, a media application may provide recommendations to a user based on the user's consumption habits, and an autonomous cleaning device may collect data as it cleans a home of a user, e.g., to learn locations of walls or furniture in the home of the user. However, users often have little control over how much data and/or which kinds of data are shared with the service providers.

To help overcome these problems, systems and methods are provided herein for determining whether a user is present within a predefined vicinity of a consumption device while a media asset is generated for display, based on wireless signal characteristics of wireless signals transmitted from networking equipment to the consumption device over a wireless network. In some embodiments, the networking equipment, e.g., Wi-Fi systems equipped with MIMO (Multiple Input Multiple Output) may provide Channel State Information (CSI) for each corresponding set of transmit and receive antennas for particular carrier frequencies. Based on the user presence information, the presentation of the second media asset at the consumption device may be modified (e.g., to pause or stop the media asset if the user is determined to have moved to a location that is outside a predefined vicinity surrounding the consumption device). Such aspects enable leveraging wireless network characteristics, e.g., correlating changes in how Radiofrequency (RF) energy is absorbed or reflected with whether someone or something is present or not and/or whether someone or something is moving, to determine, without requiring user input, whether a user has moved out of range of a consumption device at which a media asset is generated for display. Accordingly, the expenditure of unnecessary bandwidth, computing resources and networking resources can be avoided by both content providers and users; users can automatically retain their playing position of the media asset if they move out of range of the consumption device during playing; and the providing of supplemental content to an empty room can be avoided, thereby more efficiently utilizing bandwidth and energy. Moreover, the ubiquitous availability of network devices may be leveraged, without implicating the same privacy concerns of a camera.

In some embodiments, the systems and methods may be configured to identify a user interaction with playing of a first media asset (e.g., by detecting user input starting, ending or requesting trick-playing for the first media asset) generated for presentation at a consumption device, wherein the first media asset is generated for presentation using wireless signals transmitted from networking equipment to the consumption device over a wireless network. In response to the identified user interaction, the provided systems and methods may determine historical wireless signal characteristics of the wireless network. In some embodiments, user presence may be verified using techniques separate from analyzing the historical wireless signal characteristics (e.g., a sensor such as, for example, a camera or a smart lock to detect user presence).

While a second media asset is generated for presentation at the consumption device, the provided systems and methods may determine current wireless signal characteristics of the wireless network; determine user presence information by comparing current wireless signal characteristics of the wireless network to the historical wireless signal characteristics of the wireless network; and modify the presentation of the second media asset at the consumption device based on the user presence information. Such aspects enable leveraging historical wireless signal characteristics (e.g., at a time when a command, such as, for example, pause or rewind, is received at the consumption device, and thus the user is likely within a predefined distance from the consumption device) to determine user presence information at a current time.

In addition, systems and methods are provided for determining wireless signal characteristics transmitted over a wireless network by network equipment in a household; generating a map of a household based on the determined wireless signal characteristics; receiving an application programming interface (API) request from a service provider; determining an authorization level of the service provider; identifying, based on the authorization level of the service provider, at least one portion of the map and at least one of the wireless signal characteristics to transmit to the service provider; and transmitting, via the API, the identified at least one portion of the map and at least one of the wireless signal characteristics to the service provider. Such aspects enable selectively controlling which user data (e.g., related to user presence in a particular room of a household) is provided to a service provider, e.g., by providing certain data only to service providers authorized to receive certain data. In some embodiments, the expenditure of computing resources may be reduced by determining, e.g., that data for certain rooms of the household need not be processed, or that certain service providers may require less user data than others. For example, an autonomous cleaning service may merely be concerned whether a room is empty or not (e.g., to minimize the likelihood of users obstructing a cleaning path of an autonomous cleaning device), whereas a media recommendation service may desire to obtain information regarding how many (and which) users are in a room (e.g., for media recommendations or to implement parental control functions). Moreover, a user may selectively decide how much data should be shared with certain network-connected devices.

In some embodiments, the wireless network is a Wi-Fi network, and the historical wireless signal characteristics and current wireless signal characteristics correspond to channel state information. Modifying the presentation of the media asset at the consumption device may comprise any suitable modification (e.g., trick play, pausing or stopping presentation of the media asset, etc.).

In some aspects of this disclosure, modifying the presentation of the media asset at the consumption device based on the user presence information comprises determining, based on the user presence information, that a user has exited a vicinity of the consumption device and entered a vicinity of an additional consumption device, and causing the second media asset to be generated for display at the additional consumption device. For example, wireless network characteristics may indicate that a user, viewing a media asset on a device in a living room, has moved upstairs to a bedroom, and in response a device in the bedroom may be resumed from a point in the media asset at which the user exited the living room. In some embodiments, the determination that a user has exited a vicinity of the consumption device may be based on the user being determined to be outside such vicinity for a predefined period of time.

In some embodiments, determining user presence information by comparing the current wireless signal characteristics of the wireless network to the historical wireless signal characteristics of the wireless network comprises training a machine learning model using the historical wireless signal characteristics, wherein the machine learning model is trained to output a determination of the user presence information; inputting the current wireless signal characteristics to the trained machine learning model; and determining, based on the determination of the user presence information output by trained machine learning model, whether a user is within a vicinity of the consumption device to enable consumption of the second media asset. In some aspects of this disclosure, the historical wireless signal characteristics further comprise: wireless signal characteristics during a plurality of times during which the user is determined not to be within the vicinity of the consumption device while a media asset is being generated for presentation; and wireless signal characteristics during a plurality of times during which the user is determined to be within the vicinity of the consumption device while a media asset is being generated for presentation.

In some aspects of this disclosure, the second media asset is provided by a content provider to a group user profile associated with a plurality of user profiles, and the method further comprises determining, by the content provider and based on the user presence information, that a first user associated with a first user profile is in a vicinity of the first consumption device; and automatically logging in the first user to the first user profile.

In some embodiments, modifying the presentation of the second media asset at the consumption device based on the user presence information comprises instructing a server to refrain from providing supplemental content to the consumption device In some aspects of this disclosure, based on the user presence information, a plurality of times that the user exited a vicinity of the consumption device during which a particular type of supplemental content was generated for presentation may be determined, and a level of user interest in the particular type of supplemental content may be determined based on the determined plurality of times. Such aspects may be used to measure the effectiveness of supplemental content (e.g., collecting a subset of motion data from multiple subscribers in response to the playing of the supplemental content, such as whether one or more users left a room during the playing of the supplemental content, motion data of users of certain demographics or located in certain regions during playing of supplemental content, etc.).

In some embodiments, a map of a household in which the consumption device is located may be generated, wherein the map reflects a location of the consumption device and a location of the networking equipment. A profile for each user in the household may be generated, and, based on the current wireless signal characteristics, a determination may be made whether a user in the vicinity of the consumption device is associated with a profile indicating an age of the user is below a predefined age. Modifying the presentation of the second media asset at the consumption device may be performed in response to determining the user in the vicinity of the consumption device is associated with a profile indicating the age of the user is below the predefined age.

For example, wireless signal characteristics may be indicative of a particular height of a detected user (and/or whether a user ever interacts with media assets), which may be used to differentiate between an adult and a child and/or a pet.

In some aspects of this disclosure, based on the current wireless signal characteristics and the generated profiles, a determination may be made that a first user of the plurality of users is no longer in the vicinity of the consumption device and a second user is in the vicinity of the consumption device. Modifying the presentation of the second media asset at the consumption device may be performed in response to determining the first user is no longer in the vicinity of the consumption device and the second user is in the vicinity of the consumption device.

In some embodiments, a recommendation may be provided to a service provider to subscribe to notifications related to the at least one portion of the map and the at least one wireless signal characteristic, based on a service provided by the service provider.

In some aspects of this disclosure, the methods and systems further comprise determining the service provider is a first type of service provider; determining one or more wireless signal characteristics associated with a particular room in the household that are not relevant to a service provided by the service provider; and declining to transmit the one or more wireless signal characteristics to the service provider. The first type of service provider may be a media content provider.

In some embodiments, declining to transmit the one or more wireless signal characteristics to the service provider comprises declining to process the one or more wireless signal characteristics.

In some aspects of this disclosure, the methods and systems further comprise receiving an API request from an additional service provider; determining an authorization level of the additional service provider; identifying, based on the authorization level of the service provider, at least two portions of the map and at least two of the wireless signal characteristics to transmit to the additional service provider; and transmitting, via the API, the identified at least two portions of the map and at least two of the wireless signal characteristics to the additional service provider, wherein a greater number of portions of the map and of the wireless signal characteristics are transmitted to the additional service provider than to the service provider. In some embodiments, the additional service provider provides a home security service or an autonomous home cleaning service.

In some embodiments, determining the wireless signal characteristics transmitted over the wireless network by the network equipment in the household comprises determining user presence information by comparing current wireless signal characteristics of the wireless network to historical wireless signal characteristics of the wireless network. In some aspects of this disclosure, the methods and systems further comprise training a machine learning model using the historical wireless signal characteristics, wherein the machine learning model is trained to output a determination of the user presence information.

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and should not be considered limiting of the breadth, scope, or applicability of these concepts. It should be noted that for clarity and ease of illustration, these drawings are not necessarily made to scale.

DETAILED DESCRIPTION

As referred to herein, the term "media asset" should be understood to refer to an electronically consumable user asset, e.g., television programming, as well as pay-per-view programs, on-demand programs (as in video-on-demand (VOD) systems), Internet content (e.g., streaming content, downloadable content, webcasts, etc.), augmented reality content, virtual reality content, video clips, audio, playlists, websites, articles, electronic books, blogs, social media, applications, games, and/or any other media or multimedia, and/or combination of the above.

Figure 1:
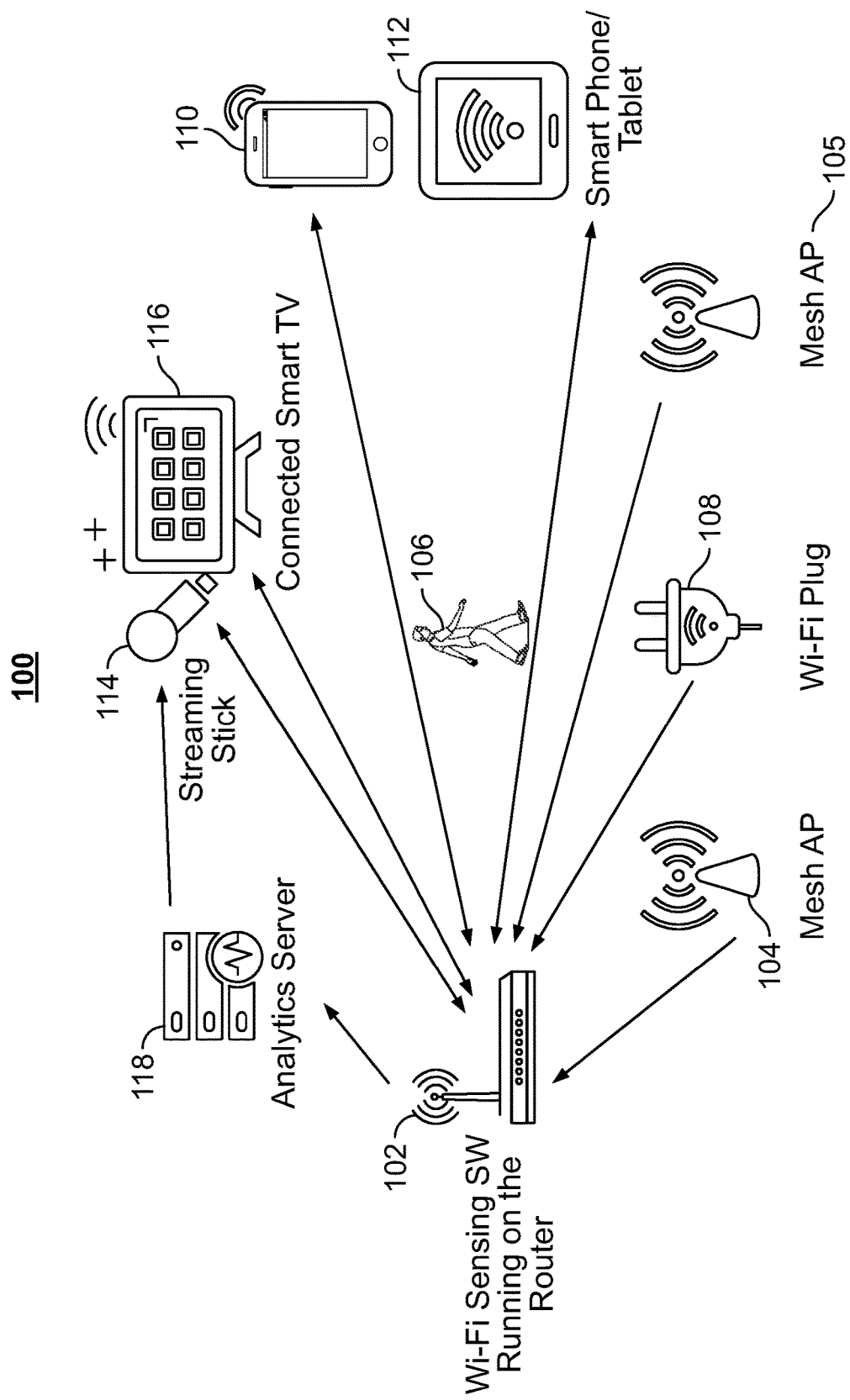
FIG. 1 shows a block diagram of an illustrative system for determining and using user presence information, in accordance with some embodiments of this disclosure.

FIG. 1 shows a block diagram of an illustrative system 100 for determining and using user presence information, in accordance with some embodiments of this disclosure. System 100 may comprise networking equipment (e.g., router 102, mesh access point 104, mesh access point 105), one or more Internet of Things (IOT) devices (e.g., Wi-Fi Plug 108, security cameras), and consumption devices (e.g., smartphone 110, tablet 112, smart television 116 in which streaming stick 114 may be inserted, gaming consoles, smart watches), which may be located in a particular physical location (e.g., a household of user 106, a place of business, a school, other organization, etc.). System 100 may comprise analytics server 118 in communication with the networking equipment, and which may be located at a location remote from the particular physical location. The networking equipment, consumption devices and IOT devices of system 100 may be equipped with antennas for transmitting and receiving electromagnetic signals at frequencies within the electromagnetic spectrum, e.g., radio frequencies, to communicate with each other over a network in a localized area. The network may correspond to, e.g., a Wi-Fi network, such as, for example, 802.11n, 802.11ac, 802.11ax, or Wi-Gig/802.11ad at a fronthaul of a telecommunications network. The devices of system 100 may communicate wirelessly over a wireless Local Area Network (WLAN) and with the Internet, and may be present within an effective coverage area of the localized network. The Internet may include a global system of interconnected computer networks and devices employing common communication protocols, e.g., the transmission control protocol (TCP), user datagram protocol (UDP) and the internet protocol (IP) in the TCP/IP internet protocol suite.

Router 102 may be configured to forward data packets from the Internet connection, received by way of a modem, to devices within the localized network of system 100 and receive data packets from such devices. In some embodiments, router 102 may include a built-in modem to provide access to the Internet for the household (e.g., received by way of cable or fiber connections included in backhaul portions of a telecommunications network), built-in switches or hubs to deliver data packets to the appropriate devices within the Wi-Fi network, built-in access points to enable devices to wirelessly connect to the Wi-Fi network, and/or system 100 may include one or more stand-alone modems, switches, routers and access points. Mesh access points 104 and 105 may comprise additional routers or network equipment positioned at various locations around the household of user 106 and in communication with router 102 to extend a range of the network. For example, mesh access points 104 and 105 may receive wireless signals from router 102 and provide the signals throughout the localized area, e.g., to more remote portions of a house of user 106 relative to router 102. In some embodiments, media assets may be provided to user 106 by way of wireless signals transmitted through the localized network, and wireless signal characteristics of the home network may be monitored (e.g., by router 102 and/or by analytics server 118) to determine user presence information and modify presentation of a media asset based on user presence information.

Figure 2:
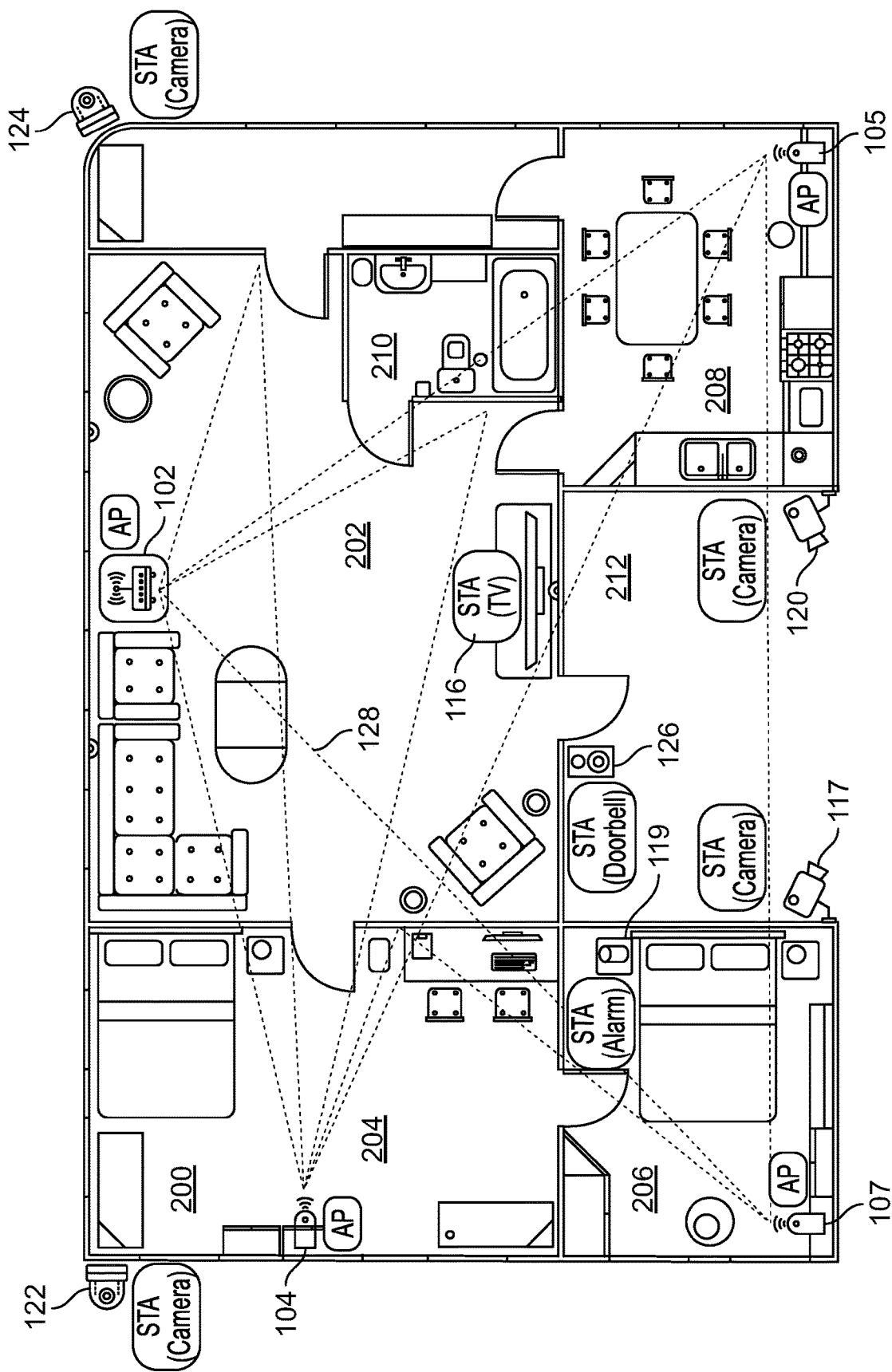
FIG. 2 shows an illustrative map that may be utilized in determining and using user presence information, in accordance with some embodiments of this disclosure.

FIG. 2 shows an illustrative map 200 which may be utilized in determining user presence information, in accordance with some embodiments of this disclosure. In some embodiments, map 200 may be generated at least in part by router 102. For example, router 102 may comprise control circuitry and memory storing one or more executable instructions, where the control circuitry may be configured to execute the one or more executable instructions to implement a wireless signal-sensing application. In some embodiments, the wireless signal-sensing application may be executed at least in part on a remote server, e.g., analytics server 118, and/or at one or more consumption devices 110, 112, 116, and/or other access points 104, 105, 107 within the coverage of the wireless network (e.g., a Wi-Fi home network). The wireless signal-sensing application may monitor propagation patterns of wireless signals over the localized network (e.g., within the household of user 106) over time and determine wireless signal characteristics based on the monitored wireless signals. In some embodiments, the wireless signal-sensing application may use the detected wireless signal characteristics to monitor motion within the residence/building, and build a baseline of activity and streaming traffic within the localized area (e.g., household of user 106) in order to generate map 200. Map 200 may be used to determine user presence information associated with particular rooms of the household.

Map 200 may depict a plan view of a particular floor of a household of a user, in which a plurality of user equipment and network equipment devices are present and may be in communication over the localized network (e.g., a Wi-Fi home network). Router 102 may route wireless signals throughout the household to television 116, access points 104, 105, 107, cameras 117, 120, 122, 124, alarm 119, and smart doorbell 126. Map 200 may depict a propagation path 128 of wireless signals, e.g., from router 102 to other access points and/or consumption devices, as detected by the wireless signal-sensing application. Map 200 may comprise a plurality of rooms, e.g., living room 202, first bedroom 204, second bedroom 206, kitchen 208, bathroom 210, and front patio 212, which may be mapped out and identified by the wireless signal-sensing application based on the wireless signal characteristics determined over time. Based on the detected wireless signal characteristics, the wireless signal-sensing application may build a list of connected devices in the environment (e.g., based on determining an initial state, location and list of devices with respect to router 102 and the other access points) and identify the consumption devices from the identified connected devices. In some embodiments, cross-coordination between the various access points may enhance the detail of the generation of map 200.

In some embodiments, in generating map 200, the wireless signal-sensing application may classify the devices into various categories. For example, wireless signal-sensing application may determine that devices streaming media at speeds exceeding a certain threshold (e.g., 5 Mb/s) may be deemed to be streaming HD video content to television 116, whereas devices determined to be streaming media at a different speed (e.g., 1-3 Mb/s) may be deemed to be streaming HD video content to smartphone 110 or tablet 112 (or SD content to television 116). In some embodiments, the representations depicted in map 200, and associated user presence information, may be stored in association with one or more data structures within router 102, as discussed in more detail in connection with FIG. 3. Alternatively or additionally, user presence information may be determined by one or more sensors (e.g., cameras 117, 120, 122, 124 or radar sensors), which may be positioned within a predefined area from consumption devices.

Figure 3:
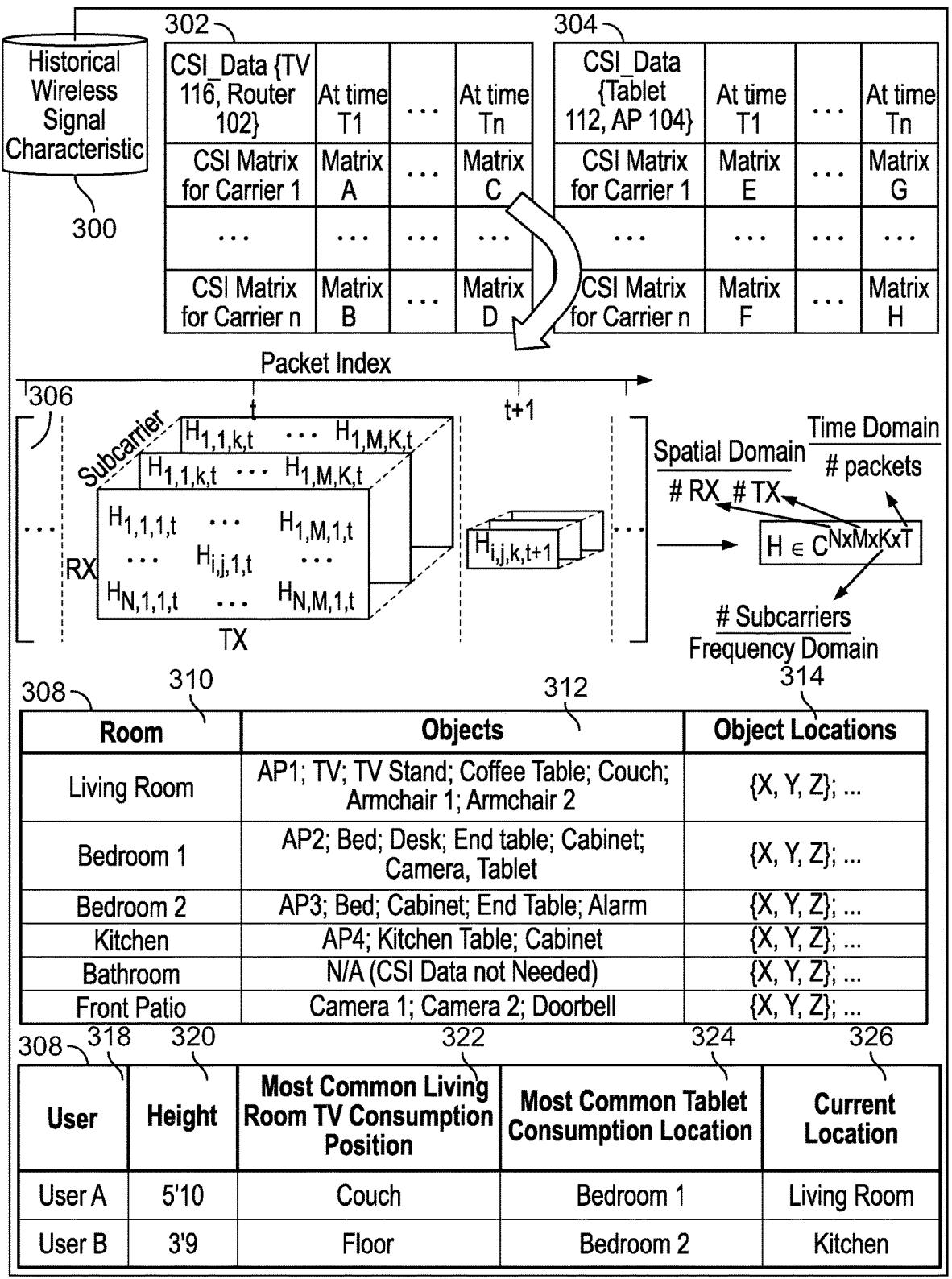
FIG. 3 shows illustrative data structures of wireless signal characteristics, in accordance with some embodiments of this disclosure.

FIG. 3 shows illustrative data structures of wireless signal characteristics, in accordance with some embodiments of this disclosure. In some embodiments, the wireless signal-sensing application may determine wireless signal characteristics based on one or more of channel state information (CSI), Received Signal Strength Indicator (RSSI) and received channel power indicator (RCPI). For example, router 102 may be equipped with MIMO (Multiple Input Multiple Output) technologies, e.g., MIMO-OFDM, multi-user MIMO enabling multiple devices to communicate with router 102 simultaneously, or single-user MIMO, which may provide CSI for each corresponding set of transmit and receive antennas for particular carrier frequencies (e.g., as between antennas of router 102 and antennas of consumption devices). Wireless signals may propagate from the transmitter to the receiver at certain carrier frequencies along multiple paths, and a time series of CSI measurements capturing how wireless signals travel through surrounding objects and humans in time, frequency, and spatial domains may be determined and used to generate map 200. In some embodiments, the wireless signal-sensing application may generate map 200 and use map 200 to determine what the wireless environment of the household looks like, and the wireless signal-sensing application may identify subsequent changes in that landscape, e.g., based on the way the RF energy is absorbed or reflected, which may correlate with someone or something being present or not present, and/or moving or being stationary. In some embodiments, a time series of wireless signal information (e.g., CSI, RSSI, RCPI) may be collected by router 102 and access points 104, 105, 107, and the wireless signal information collected by access points 104, 105, 107 and the other devices of the network may be transmitted to router 102 to build a mesh-sensing network.

As shown in FIG. 3, the wireless signal information determined by the wireless signal-sensing application may be stored in association with an historical wireless signal characteristics data structure 300 (e.g., a database at analytics server 118, and/or stored at router 102 or other access points or devices in the household or environment). The CSI data may correspond to a three-dimensional matrix of values corresponding to a number of transmitting antennas (Tx), a number of receiving antennas (Rx) and a number of subcarriers, and may be indicative of amplitude and phase variation of a channel within a frequency used in the wireless transmissions. CSI is discussed in more detail in Y. Ma et al., "WiFi Sensing with Channel State Information: A Survey," ACM Comput. Sur., Vol. 52, No. 3, Article 46. June 2019, the contents of which are hereby incorporated by reference herein in their entirety.

In some embodiments, historical wireless signal characteristics data structure 300 may store CSI data associated with, or otherwise used to generate, map 200 in, e.g., tuple format (STA/Wi-Fi Endpoint, Connected/Associated AP). For example, table 302 may store matrices of CSI data associated with {TV 116, Router 102} at various points in time as detected by the wireless signal-sensing application, and table 304 may store matrices of CSI associated with {Tablet 112, AP 104} at various points in time as detected by the wireless signal-sensing application. The matrices may correspond to the format illustrated at 306. In the example of 306, H may represent the CSI matrix, Rx-Tx may represent a receiving and transmitting antenna pair, M and N may respectively represent a number of transmit and receive antennas in a MIMO-OFDM channel, K may represent a number of subcarriers in the frequency domain, and T may represent a number of packets in the time domain.

In some embodiments, tables similar to tables 302 and 304 may be generated for each consumption device and each networking equipment of the household, and such tables, along with tables 302 and 304 may be used to generate table 308. Table 308 may store information for a plurality of rooms of the household depicted in map 200 and determined based on the CSI data, including a room identifier indicated in column 310, indications in column 312 of objects (e.g., network equipment and user equipment, such as, for example, consumption devices) in the respective rooms detected based on the CSI data, and respective locations, indicated in column 314, of the objects indicated in column 312. In some embodiments, CSI data may not be collected for certain rooms, e.g., bathroom 210, if consumption devices are rarely used in such room.

In some embodiments, historical wireless signal characteristics data structure 300 may store information, derived based on the CSI data detected by the wireless signal-sensing application, associated with profiles for one or more users of the household, as indicated in table 316. Table 316 comprises column 318, identifying one or more users of the household; column 320, indicating respective heights of such users; an indication in column 322 of a most common consumption position in a particular room for a particular device (e.g., living room TV 116), an indication of a most common consumption location associated with a particular device, as indicated in column 324; and a current location of the respective user indicated in column 326. In some embodiments, the profiles of the one or more users may be added or appended to the stored tuple. In some embodiments, data structure 300 may be configured to store indications of certain time points in the historical wireless signal characteristics at which the user is detected to have issued commands to media devices, which may be used to confirm the timing, in connection with CSI matrix 306, of when a user is present (e.g., and watching TV).

Figure 4:
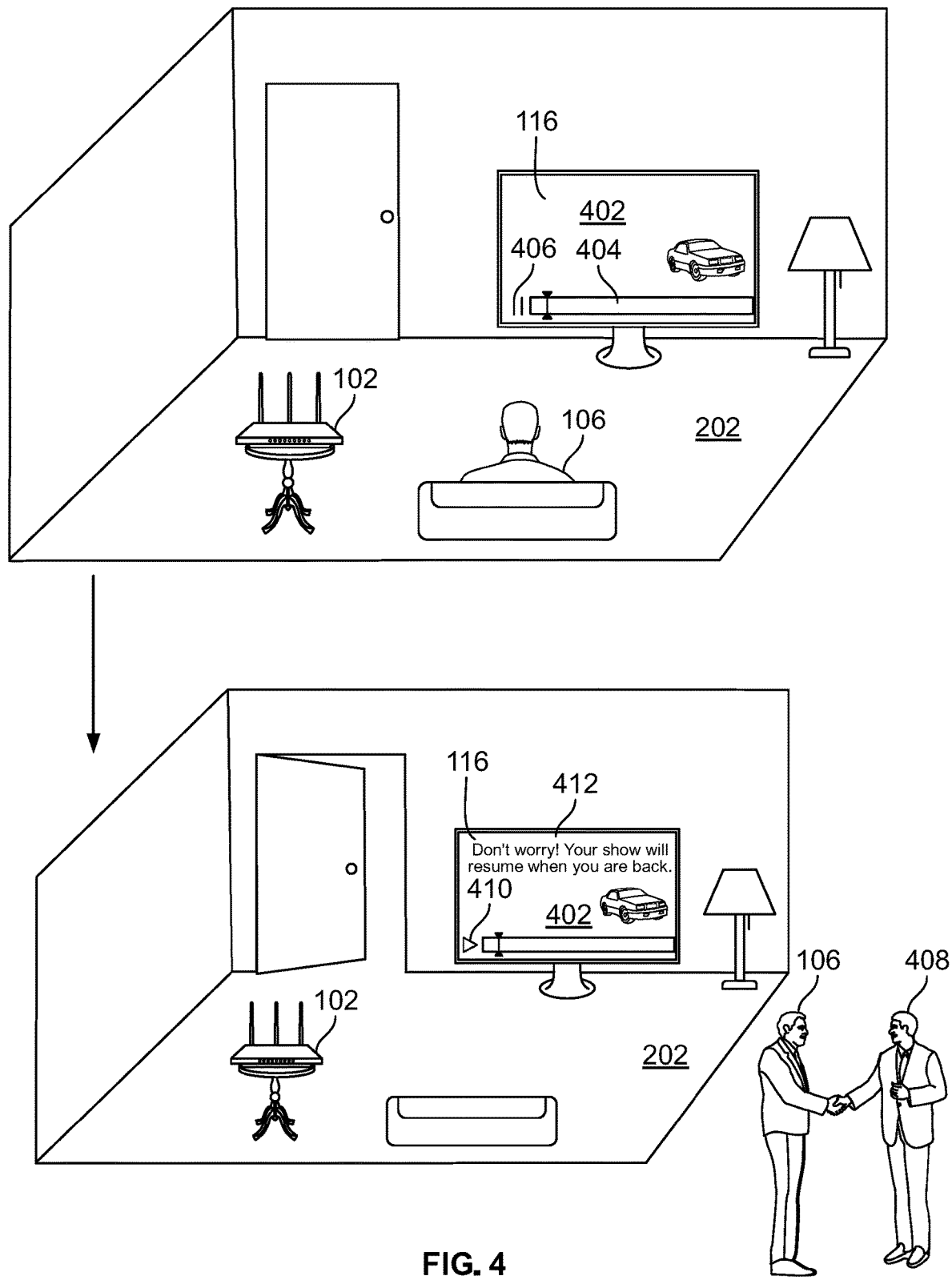
FIG. 4 shows an illustrative example of modifying presentation of a media asset at a consumption device based on user presence information, in accordance with some embodiments of this disclosure.

FIG. 4 shows an illustrative example of modifying presentation of a media asset at a consumption device based on user presence information, in accordance with some embodiments of this disclosure. As shown in FIG. 4, consumption device 116 located in living room 202 may be generating for display media asset 402, for consumption by user 106 (e.g., associated with user profile "User A" in table 316 of FIG. 3). In some embodiments, a media application, e.g., an over-the-top (OTT) media service, running at least in part on consumption device 116, may generate for display media asset 402. Media asset 402 may be generated for display based on wireless signals transmitted by router 102 to consumption device 116, and such wireless signals may be associated with a broadcast or stream of any suitable content (e.g., requested by the user from a remote server, such as, for example, media content source 1202 of FIG. 12). In some embodiments, when generating for presentation media asset 402, progress bar 404 may be provided, and/or an option 406 to pause media asset 402 may be provided. In some embodiments, the media application may be permitted to subscribe to a notification service associated with the user presence information determined by the wireless signal-sensing application, e.g., the media application may invoke an API to access the user presence information (e.g., via analytics server 118).

The wireless signal-sensing application may be configured to determine wireless signal characteristics associated with the current consumption session of media asset 402. For example, the wireless signal-sensing application may determine current wireless signal characteristics, e.g., CSI data indicative of the position of user 106 on the couch in living room 202 while media asset 402 is generated for presentation, based on the properties of the propagation of wireless signals from router 102 to consumption device 116. As shown in the lower portion of FIG. 4, user 106 may exit living room 202, e.g., to meet neighbor 408 who had rang a doorbell (e.g., smart doorbell 126). The wireless signal-sensing application may detect such movement of user 106 based on a change in the current wireless signal characteristics associated with the consumption session of media asset 402, e.g., the wireless signals may propagate in a different manner due to the absence of user 106 from living room 202 as compared to the historical wireless signal characteristics associated with the scenario of the upper portion of FIG. 4 where user 106 is present in living room 202 consuming media asset 402 and/or the wireless signal landscape on a path of user 106 to meet neighbor 408 may reflect the movement of user 106.

Based on the determined wireless signal characteristics, the wireless sensing application may determine user presence information corresponding to the absence of user 106 from living room 202. The wireless signal-sensing application may cause the presentation of media asset 402 to be modified (e.g., paused or stopped) and may cause notification 412 to be generated for display, e.g., by notifying the media application (e.g., directly or by way of intermediary analytics server 118) of such user presence information and enabling the media application to modify the presentation of media asset 402 and generate for display notification 412, or the wireless signal-sensing application may intervene during presentation of media asset 402 by the media application to modify the presentation of the media asset and generate for display notification 412. Notification 412 may comprise a message indicating that presentation of media asset 402 has been paused due to the user presence information indicating the user has moved to a location outside a predefined range from consumption device 116.

In some embodiments, prior to causing modification of the presentation of media asset 402 based on the user presence information, the wireless signal-sensing application may wait until a predefined time period has passed exceeding a threshold period of time (e.g., 20 seconds). This may avoid interrupting the presentation of media asset 402 if user 106 intends to return to the room within a short period of time (e.g., 5 seconds, such as to grab a water bottle in an adjacent room) that is below the predefined threshold. In some embodiments, the wireless signal-sensing application and/or media application may enable user 106 to set a desired threshold period of time, and/or the threshold period of time may be dynamically adjusted based on a current scene (e.g., the threshold may be longer if a user profile of user 106 indicated user 106 is unlikely to be interested in a current scene).

In some embodiments, the wireless signal-sensing application and/or media application may provide a global-level streaming parameter which may be set by user 106 to indicate whether (and how) a media asset should be modified (e.g., paused or stopped) when user 106 is determined to have exited the predefined range surrounding consumption device 116. For example, user 106 may prefer that presentation of media asset 402 be stopped rather than paused when he or she exits the room. In some embodiments, the progress point of media asset 402 at which presentation of media asset 402 may be modified (e.g., paused) may be an initial progress point corresponding to a time at which user 106 is detected to have exited a vicinity of consumption device 116, rather than the progress point of media asset 402 being generated for display when the predefined time period expires (e.g., media asset 402 may be rewound to the initial point even if paused at the point at which the predefined time period expires, since user 106 likely missed each portion of media asset 402 after the initial point). In some embodiments, the vicinity of the consumption device may be considered to be a location close enough for a user to consume content (e.g., 10 feet), and may vary based on a type of content and/or a type of consumption device (e.g., a big screen television may be considered to have a larger predefined vicinity than a smartphone).

In some embodiments, option 410 may be generated for display, enabling user 106 to select to resume presentation of media asset 402 upon returning to living room 202. In some embodiments, the presentation of media asset 402 may be modified automatically upon the return of user 106 to living room 202, e.g., in response to determining user presence information indicates user 106 has returned to living room 202. In some embodiments, a change in wireless signal characteristics as between the current wireless signal characteristics and historical wireless signal characteristics may be determined based on whether an amount of change in CSI data exceeds a predefined threshold, e.g., to avoid modifying presentation due to minor changes in wireless signal characteristics that may not be associated with a change in user presence in living room 202.

In some embodiments, the wireless signal-sensing application may control the modification of the presentation of media asset 402 based on the user profile of the user determined to be consuming media asset 402 on consumption device 116. For example, the wireless signal-sensing application may determine that user 106 is consuming media asset 402 in living room 202. The wireless signal-sensing application may subsequently cause the presentation of media asset 402 to be modified in response to determining the user presence information indicates user 106 has exited a vicinity of consumption device 116. Thereafter, the wireless signal-sensing application may determine, based on the user presence information, that another user (e.g., user 408) has entered the vicinity of consumption device 116. In this instance, the wireless signal-sensing application may decline to resume presentation of media asset 402, based on a determination that a user profile for user 408 (e.g., guest) does not correspond to a user profile of user 106, who had been consuming media asset 402 at consumption device 116.

In some embodiments, modifying the presentation of a media asset at a consumption device based on user presence information comprises instructing a server to refrain from providing supplemental content to the consumption device. For example, supplemental content (e.g., an advertisement) may be scheduled to be provided to consumption device 116 from a remote server (e.g., a supplemental content server) at a particular time. If the wireless signal-sensing application determines user presence information indicating user 106 has exited the vicinity of consumption device 116 at the particular time, the wireless signal-sensing application may notify one or more servers accordingly (e.g., analytics server 118, which may notify the supplemental content server or the portion of the wireless signal-sensing application that may be running on the consumption device may communicate directly with the supplemental content server). Such notification may instruct the supplemental content server to refrain from providing an advertisement to consumption device 116 at the particular time, and the supplemental content server 1224 may instead provide the supplemental content in response to receiving an indication from the wireless signal-sensing application that user 106 has returned to a vicinity of consumption device 116.

Figure 5:
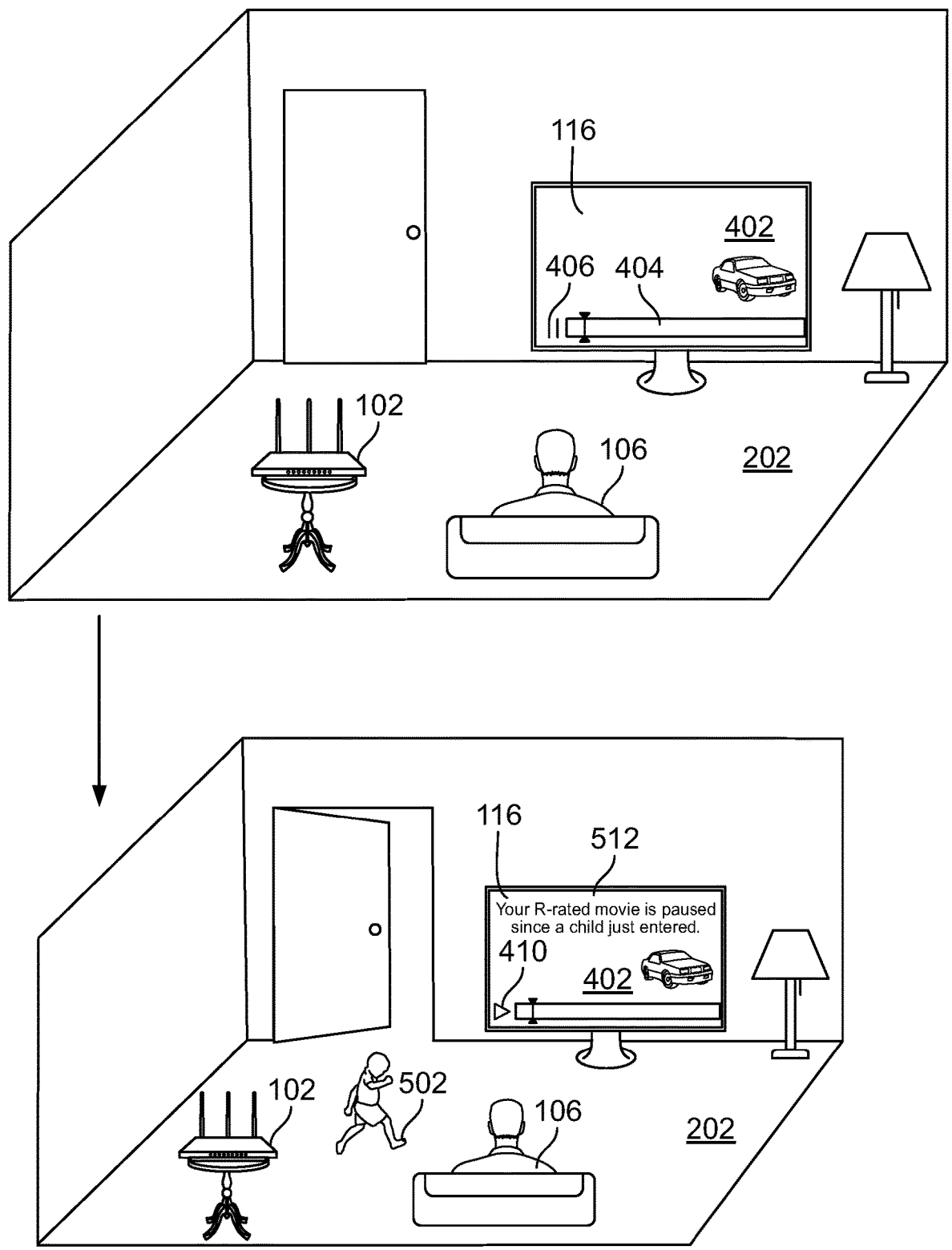
FIG. 5 shows an illustrative example of modifying presentation of a media asset at a consumption device based on user presence information, in accordance with some embodiments of this disclosure.

FIG. 5 shows an illustrative example of modifying presentation of a media asset at a consumption device based on user presence information, in accordance with some embodiments of this disclosure. The upper portion of FIG. 5 may correspond to a similar scenario as depicted in the upper portion of FIG. 4, in that the media application running at least in part on consumption device 116 may generate for presentation media asset 402 based on wireless signals received from router 102. The wireless signal-sensing application may identify current wireless signal characteristics (e.g., CSI data) corresponding to the time point associated with the upper portion of FIG. 5. As shown in the lower portion of FIG. 5, a user 502 (e.g., a child user, associated with the user profile of "User B" indicated in category 318 of table 316) may enter living room 202. In some embodiments, the wireless signal-sensing application may determine user 502 is a child based on one or more attributes of the user indicated by the wireless signal characteristics (e.g., whether the height of user 502 is below a predefined threshold, such as, for example, four feet).

The presence of user 502 may be detected by comparing current wireless signal characteristics to historical wireless signal characteristics (e.g., from the time point associated with the scenario in the upper portion of FIG. 5). Based on the detecting the presence of user 502, the wireless sensing application may modify the presentation of media asset 402. For example, the wireless sensing application may cause the modification of the presentation of media asset 402 by notifying the media application (e.g., via analytics server 118, when the media application is subscribed to notification published by the wireless sensing application) that a user below a certain age (e.g., 17) has entered living room 202. The wireless sensing application and/or the media application may determine (e.g., based on metadata of media asset 402) that media asset 402 is associated with a parental rating (e.g., rated "R") that is not appropriate for a user in the age group of user 502, and may modify presentation of media asset 402 accordingly (e.g., by pausing or stopping presentation of media asset 402; by lowering the volume of media asset 402; by inserting supplemental content at the current progress point, such as, for example, an advertisement that is suitable for a younger audience). The pause command may be transmitted by the media application running on consumption device 116 to a remote server (e.g., requested by the user from a remote server, such as, for example, media content source 1202 of FIG. 12). In some embodiments, notification 512 may be provided to user 106 by the wireless sensing application and/or the media application, indicating that presentation of media asset 402 has been modified based on detecting the presence of user 502 in the room.

Figure 6:
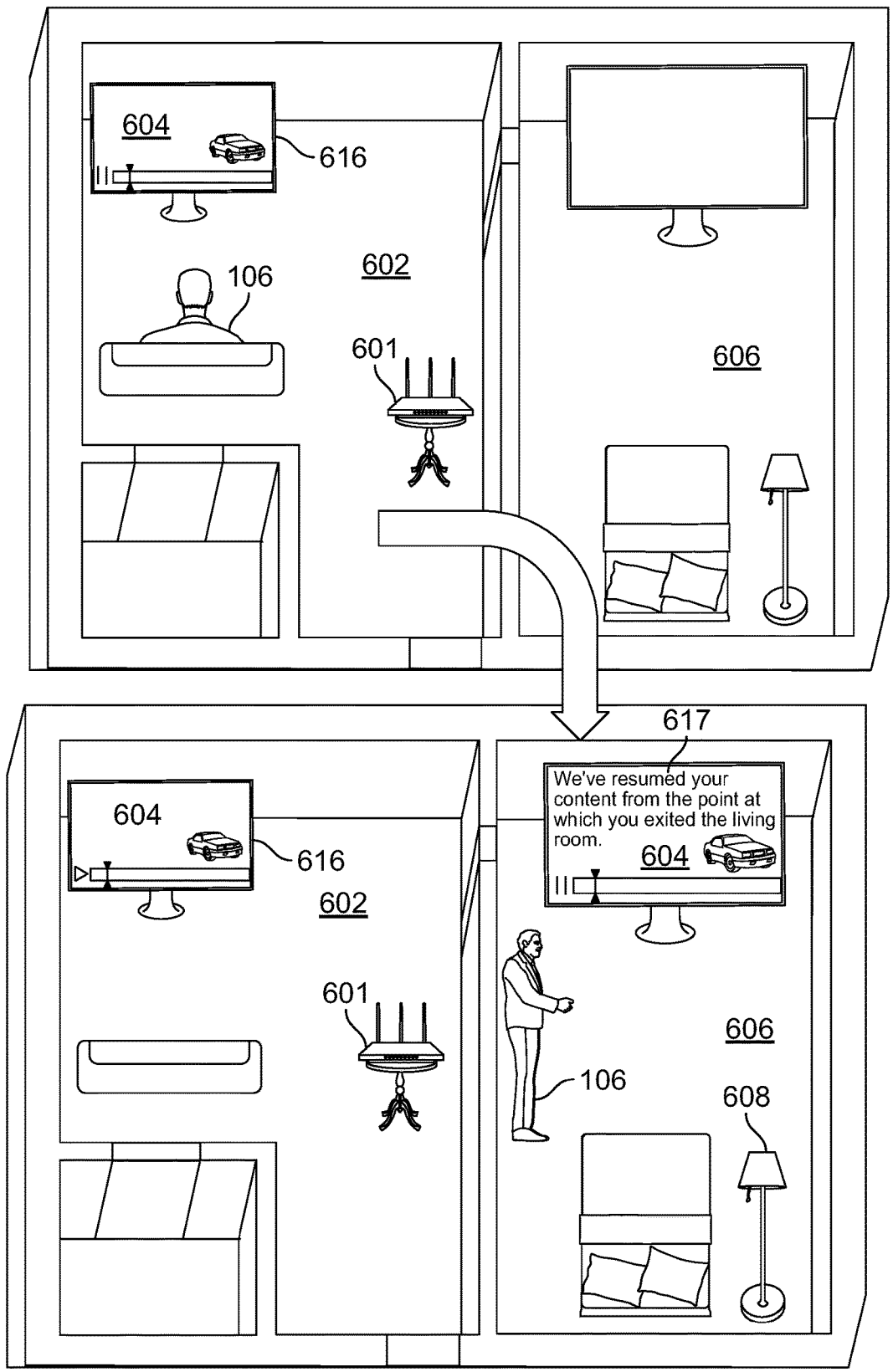
FIG. 6 shows an illustrative example of modifying presentation of a media asset at a consumption device based on user presence information, in accordance with some embodiments of this disclosure.

FIG. 6 shows an illustrative example of modifying presentation of a media asset at a consumption device based on user presence information, in accordance with some embodiments of this disclosure. As shown in the upper portion of FIG. 6, consumption device 616 may be generating for presentation media asset 604 in living room 602 to user 106, based on wireless signals transmitted by router 601 to consumption device 616. The wireless sensing application may identify current wireless signal characteristics corresponding to the current viewing session of media asset 604 in living room 602, and determine user presence information of user 106 based on such wireless signal characteristics (e.g., based on a comparison of the determined current wireless signal characteristics to historical wireless signal characteristics associated with one or more prior instances in which user 106 or another user was determined to be present in a vicinity of consumption device 616 or another consumption device). For example, if a predefined degree of matching or predefined level of overlap between the current wireless signal characteristics (e.g., CSI data) and particular historical wireless signal characteristics is present, the current wireless signal characteristics may be determined to match user presence information associated with the particular historical wireless signal characteristics.

As shown in the lower portion of FIG. 6, user 106 may decide to move from living room 602 to another area of the house, such as bedroom 606. The wireless sensing application may identify this movement based on a change in wireless signal characteristics (e.g., how wireless signals propagate from router 601 to consumption device 616 and/or consumption device 617, differences in how RF energy is absorbed or reflected by humans or objects, etc.) as that user 106 is on the move or has moved to bedroom 606. In some embodiments, the wireless signal-sensing application may determine user presence information for living room 602 now indicates the room has no users, whereas user presence information for bedroom 606 now indicates user 106 is present in bedroom 606. In response to this determination, the wireless signal-sensing application may modify presentation of media asset 604 (or may communicate with a media application, which may be generating for display media asset 604 in living room 602, to cause the media application to modify presentation of media asset 604). For example, presentation of media asset 604 in living room 602 may be paused or stopped, and in response to detecting user presence in a vicinity of consumption device 617, presentation of media asset 604 may be transferred or otherwise commenced at consumption device 617 in bedroom 606 may begin, e.g., from the point at which media asset 604 was paused or stopped or the point at which user 106 is determined to have moved to a location outside a predefined vicinity from consumption device 616.

In some embodiments, the wireless signal-sensing application may communicate with lamp 608 (e.g., directly to an application associated with lamp 608, or via analytics server 118), which may be connected to a home Wi-Fi network, to cause lamp 608 to be turned on upon detecting the presence of user 106 in bedroom 606. In some embodiments, the wireless signal-sensing application may be configured to turn off consumption device 616 (e.g., by communicating with smart Wi-Fi plug 108) when user 106 is determined to have moved into bedroom 606. In some embodiments, consumption device 617 may have already been turned on when user 106 entered bedroom 606, in which case the current program may be caused to switch to media asset 604, the wireless signal-sensing application may be configured to cause consumption device 617 to turn on and generate for display media asset 604 (e.g., by communicating with smart Wi-Fi plug 108). In some embodiments, sensor data from other sources (e.g., a microphone, such as for example, associated with a digital assistant in a vicinity of consumption device 616 and/or in a vicinity of consumption device 617, and/or a camera in a vicinity of consumption device 616 and/or in a vicinity of consumption device 617) may be leveraged to determine that user 106 has moved into another room of a localized area (e.g., a household of user 106, a school, a place of business, other organization, etc.). Such sensor data may be utilized in combination with the wireless sensor characteristics to determine the user presence information and determine whether to modify the presentation of media asset 604. In some embodiments, the wireless signal-sensing application may refrain from modifying presentation of content, based on determining that the consumption device presenting content to user 106 is a mobile device that is being carried into another room by user 106. For example, the user presence information may indicate that the user is on the move, but at the same time the wireless signal characteristics may indicate that the mobile consumption device is being carried by user 106 (e.g., is within a threshold distance from user 106), and thus there may be no need to modify presentation of the media asset.

In some embodiments, the wireless signal-sensing application may collect consumption information with respect to certain content (e.g., supplemental content, such as, for example, advertisements). For example, the wireless signal-sensing application may determine, based on the user presence information, that a particular user (e.g., user 106 associated with the user profile indicated in table 316 of the historical wireless signal characteristics database 300 of FIG. 3) frequently exits a vicinity of consumption devices when a certain type of supplemental content is provided to user 106. The wireless signal-sensing application may provide this information to analytics server 118, which may generate statistics or metrics related to effectiveness of the supplemental content for certain users of a certain demographic and region. On the other hand, the wireless signal-sensing application may determine that certain types of supplemental content are more effective for certain demographics or regions, e.g., if users of the particular demographic or region tend to remain in the vicinity of the consumption device generating for display the supplemental content, as determined by the user presence information. Based on this information, analytics server 118 may determine certain supplemental content that is likely to interest users of a certain demographic or region and provide this information to certain subscribers (e.g., a media content provider that provides supplemental content to users).

The user presence information may be utilized for various purposes. For example, based on the presence information, an automatic log-in process may be initiated. Certain media applications comprise multiple users associated with a global user profile (e.g., multiple Netflix profiles within a single Netflix subscription may be displayed to each user of the subscription, and the user may navigate to the desired profile). In some embodiments, profile detection and authorization may be performed based on a personalized Wi-Fi signal pattern detected by the wireless signal-sensing application (e.g., wireless signal characteristics indicative of a particular user profile stored in association with data structure 300). For example, historical wireless signal characteristics may indicate that a particular user is of a certain height or build and/or may walk with a certain gait or other identifying characteristics, and based on such detected characteristics, cause the media application to automatically login to the identified user's profile, without requiring user input (e.g., by notifying analytics server 118 of the particular user, which in turn may notify the media application, or by directly notifying the media application). As another example, suggestions may be made to the user based on the detected propagation patterns of wireless signal within the localized area. For example, the wireless signal application and/or analytics server 118 may make available a suggestion API, where subscription to such API may enable notifications to be sent to a user suggesting positions at which to stream content to maximize signal level and enhance the streaming experience. In some embodiments, the wireless signal application may suggest a location to place a repeater or access point to provide better coverage for streaming in the particular area.

Figure 7:
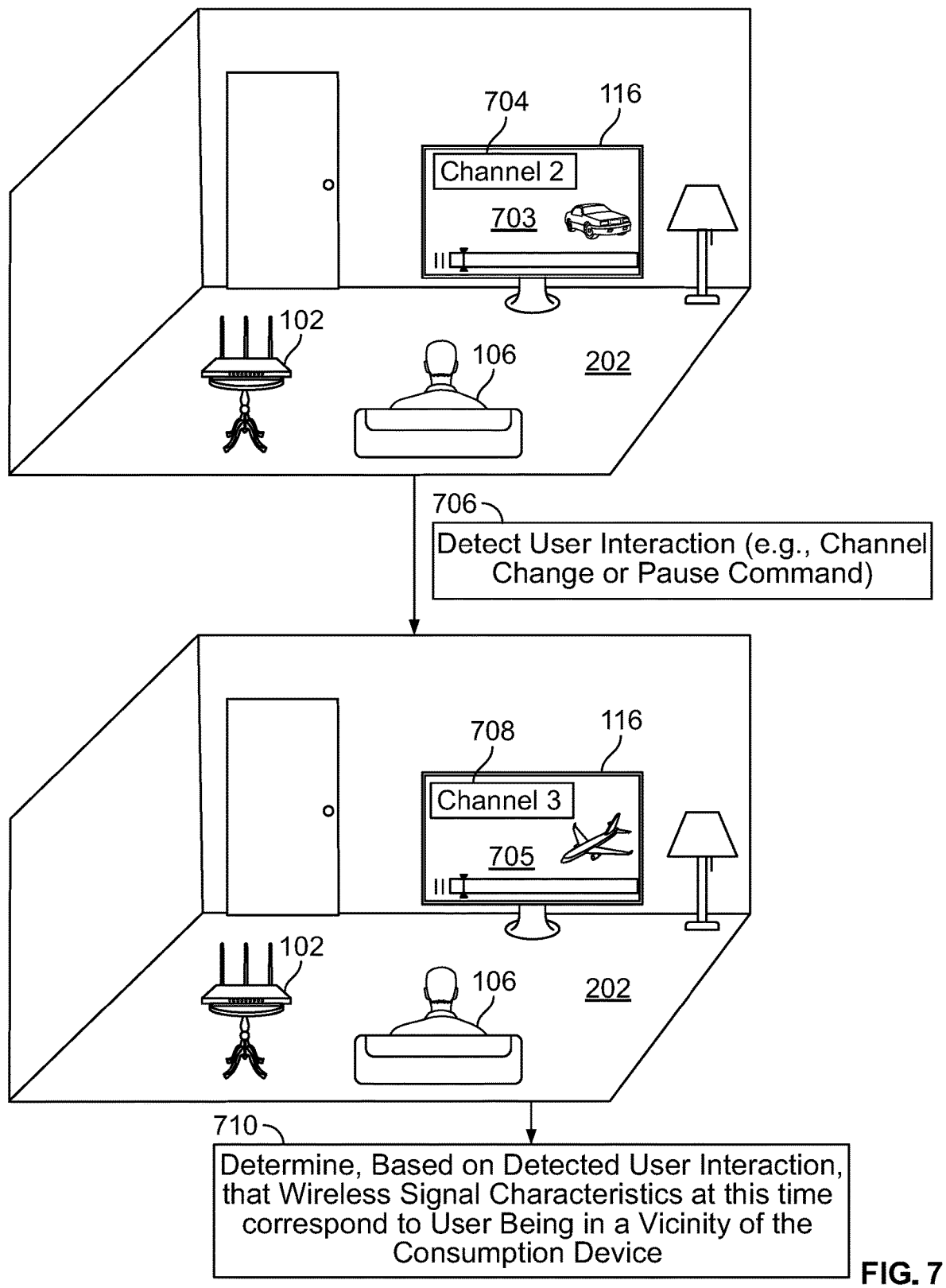
FIG. 7 shows an illustrative example of modifying presentation of a media asset at a consumption device based on user presence information, in accordance with some embodiments of this disclosure.

FIG. 7 shows an illustrative example of correlating wireless signal characteristics with user presence information, in accordance with some embodiments of this disclosure. As shown in the upper portion of FIG. 7, consumption device 116 may be generating for display media asset 703, which may be associated with a particular broadcast channel 704 (e.g., Channel 2) or media content provider. At 706, the wireless signal-sensing application and/or the media application may detect a user interaction with media asset 703, e.g., a request to pause media asset 703, a request to change the channel from channel 704 to channel 708, a request to view a different media asset on the same or different media content provider, request of the user by the wireless signal-sensing application to calibrate his or her position where he or she normally watches, detecting the user is searching on his or her smartphone for content related to content being displayed at consumption device 116, etc. At 710, the wireless sensing application may determine, based on detected user interaction, that wireless signal characteristics at this time correspond to the user being in a vicinity of the consumption device, e.g., since the user is likely present in living room 202 in order to initiate a request associated with, or to perform actions related to, media asset 202. This may be useful in building database 300 of historical wireless signal characteristics, since this instance may correspond to a data point at which wireless signal characteristics are correlated with user presence in living room 202, and may be used as a baseline for comparison with later instances where the wireless signal-sensing application is determining user presence information. In some embodiments, interactions with certain devices (e.g., a smart lock or door sensor in another room, answering the door when a smart doorbell is rang) may be detected and taken as an indication that user 106 is in another room and outside the predefined vicinity of consumption device 116. In some embodiments, the data structure of FIG. 3 may be modified to include the data collected in connection with FIG. 7. For example, the data structure of FIG. 3 may include an indicator of user presence in connection with a particular user at a particular time and in a particular location.

Figure 8:
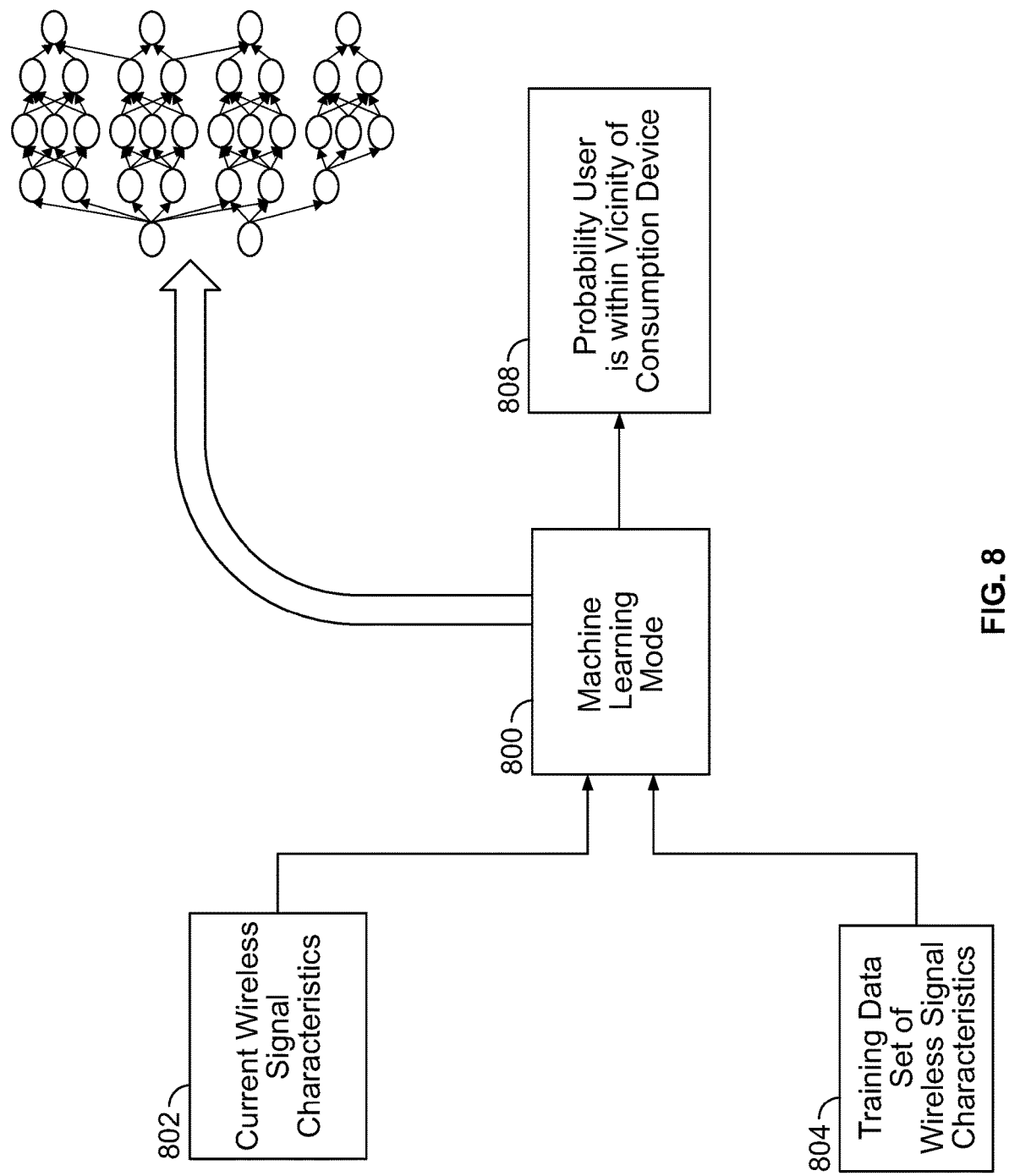
FIG. 8 shows an illustrative example of a machine learning model used to determine user presence information, in accordance with some embodiments of this disclosure.

FIG. 8 shows an illustrative example of a machine learning model 800 used to determine user presence information, in accordance with some embodiments of this disclosure. Machine learning model 800 may correspond to, for example, a neural network, a native Bayes model, logistic regression model, etc., and may be used to perform continuous human presence detection in a household. Machine learning model 800 may be used to determine whether a user is present based on input wireless signal characteristics (e.g., stored at data structure 300 of FIG. 3, which may comprise CSI measurements, RSSI, RCPI, packet sniffing analysis, etc.) determined by the wireless signal-sensing application. In some embodiments, the collected data may be processed (e.g., by applying processes such as denoising, down sampling, artifact/outlier removal, etc.) and extraction of features may be performed (e.g., using inferential statistics, frequency domain analysis) for input (e.g., as feature vectors) to machine learning model 800. Any suitable number and combination of techniques may be employed in determining the user presence information, e.g., density-based spatial clustering, fingerprinting, regression, filter models and threshold detection. In some embodiments, machine learning model 800 may be stored and executed at one or more of router 102, access points 104 and 105, consumption devices and/or analytics server 118 of FIG. 1.

In some embodiments, machine learning model 800 may be trained using training data set 804. In some embodiments, the states captured at FIG. 7 may be stored in the tables of FIG. 3, e.g., with special markers indicating when user presence is detected at a particular time in a particular location. For example, training data set 804 may comprise the example as described in connection with FIG. 7, which may be used as a data point for machine learning model 800. For example, wireless signal characteristics (e.g., stored at data structure 300 of FIG. 3) corresponding to the scenario of FIG. 7 may be labeled as an example in which the wireless signal characteristics are indicative of user presence of user 106 in living room 202, based on the inference that receiving user interactions with media asset 703, 705 indicates that user 106 is in a vicinity of consumption device 116. On the other hand, training examples may be labeled as indicating the user is not present in the vicinity of consumption device 116 during times where a media asset is not being presented at consumption device 116 or user 106 is determined as not being in the vicinity of consumption device 116 (e.g., if no user interaction with consumption device 116 has been detected for a predefined period of time; consumption device 116 is determined to be off, such as based on communications between router 102 and Wi-Fi plug 108; during times where user is determined to be not at home or sleeping, such as based on communications between router 102 and cameras 117, 120 and/or a smart lock or alarm 119 or motion sensor; determining a consumption device is being utilized by user 106 in another room, etc.).

Trained machine learning model 800 may accept as input current wireless signal characteristics 802 and output 808 a determination of user presence information, e.g., a probability that user 106 is within the vicinity of consumption device 116. In some embodiments, trained machine learning model 800 may learn user-specific behavior patterns (e.g., movement patterns and/or a gait of a certain user, most common rooms in which a user consumes content, most common location in a room in which content is consumed) and certain attributes of users (e.g., based on user profiles stored in table 316) over time, which may be used in determining whether any user is present in a room and/or is moving in or out of the room. For example, machine learning model 800 may learn the profile of each user (e.g., body width, height, age, etc.) and/or differentiate users from other objects (human vs. dog, based on height and width comparisons). In some embodiments, the user profile may be stored without any personally identifiable information. In some embodiments, the wireless signal-sensing application may determine that a request has not been received from a certain object or entity (e.g., a dog), and thus such entity may be ignored with respect to modifying presentation of a media asset. In some embodiments, the output of the machine learning model may be added to the tuple of FIG. 3.

In some embodiments, the one or more models may be dynamically updated as users and objects move in an out of certain areas (e.g., Wi-Fi AP signal capture areas) to build patterns of learning which objects are generally static within the coverage area and which objects are mobile objects, as well as their particular (e.g., historical) location and movement patterns. For instance, the model may build an awareness of a chair within a room, and an historical pattern of a human generally sitting on that chair or getting up, which may create similar signal propagation patterns over time that the model can learn and leverage for faster decisions as to whether a user is leaving the area of the streaming device or not. Such dynamic models may update and adapt map 200 providing a real-time view of the environment and observed activity, and such map data may be fed into machine learning model 800 to isolate and determine if a human is around a consumption device. In some embodiments, if the determination is made with a relatively low confidence score, router 102 or an access point may send special temporary signals to resolve the conflict. In some embodiments, movement of objects may be taken into account, e.g., the wireless sensing application may determine that a chair has been moved based on wireless signals being absorbed and/or reflected differently than when the chair was at the prior location.

Figure 9:
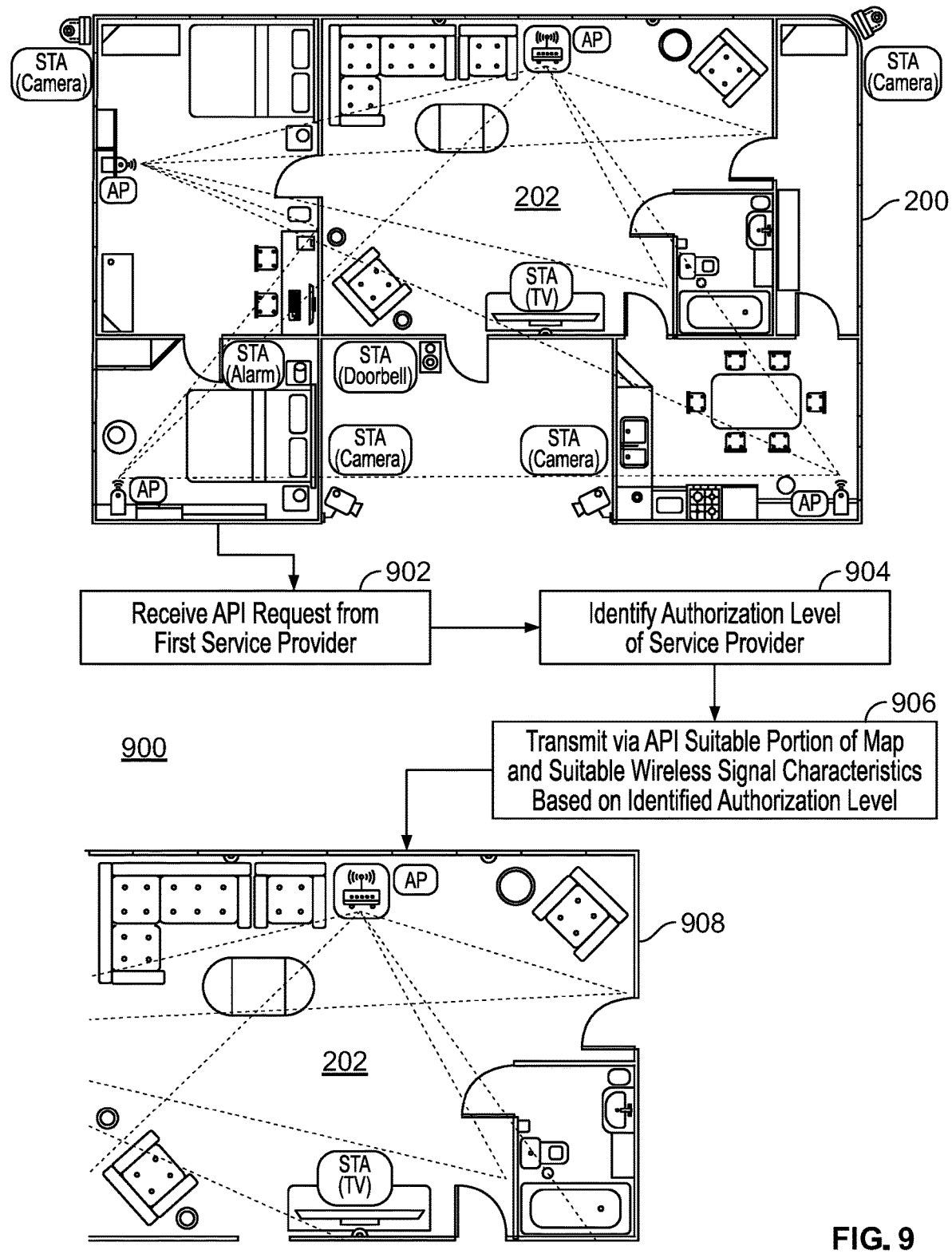
FIG. 9 shows a block diagram of an illustrative system for transmitting wireless signal characteristics to a service provider based on an authorization level of the service provider, in accordance with some embodiments of this disclosure.

FIG. 9 shows a block diagram of an illustrative system 900 for transmitting wireless signal characteristics to a service provider based on an authorization level of the service provider, in accordance with some embodiments of this disclosure. A plurality of service providers may provide various services within the localized network (e.g., Wi-Fi network) associated with a particular physical location (e.g., a household of user 106, a place of business, a school, other organization, etc.). For example, a media application may provide recommendations to a user consumption device within the network based on the user's consumption habits; an autonomous cleaning device may collect data as it cleans a home of a user, e.g., to learn locations of walls or furniture in the home of the user; a home security system may detect burglaries or break-ins; to improve voice recognition systems, etc. The wireless signal-sensing application (e.g., running at least in part on router 102 and/or analytics server 118) may implement an applications-hosting database or server, plug-ins, a software development kit (SDK), an API, or other software tools configured to provide service providers with the ability to subscribe to wireless signal characteristics and/or user presence information determined by the wireless signal-sensing application.

At 902, the wireless signal-sensing application may receive an API request from a first service provider, requesting information related to wireless signal characteristics and/or user presence information. In response to receiving the API request, the wireless signal-sensing application may determine, at 904, an authorization level of the service provider. In some embodiments, the authorization level may be determined by the wireless signal-sensing application based on a type of service provided by the service provider and/or previously received user inputs indicating granularity levels of information the particular service provider should be permitted to receive. At 906, the wireless signal-sensing application may transmit via the API a suitable portion of map 200 and suitable wireless signal characteristics based on identified authorization level. In the example of FIG. 9, the wireless signal-sensing application may determine that the authorization level for the particular service provider having sent the API request only permits the service provider to receive information related to living room 202, and thus may provide the portion of map 200 corresponding to living room 202 to the particular service provider as well as associated wireless signal characteristics information. In some embodiments, the wireless signal-sensing application may cause such information to be transmitted to the service provider (e.g., associated with a device in the home network of the user and/or an associated server) by way of analytics server 118.

Figure 10:
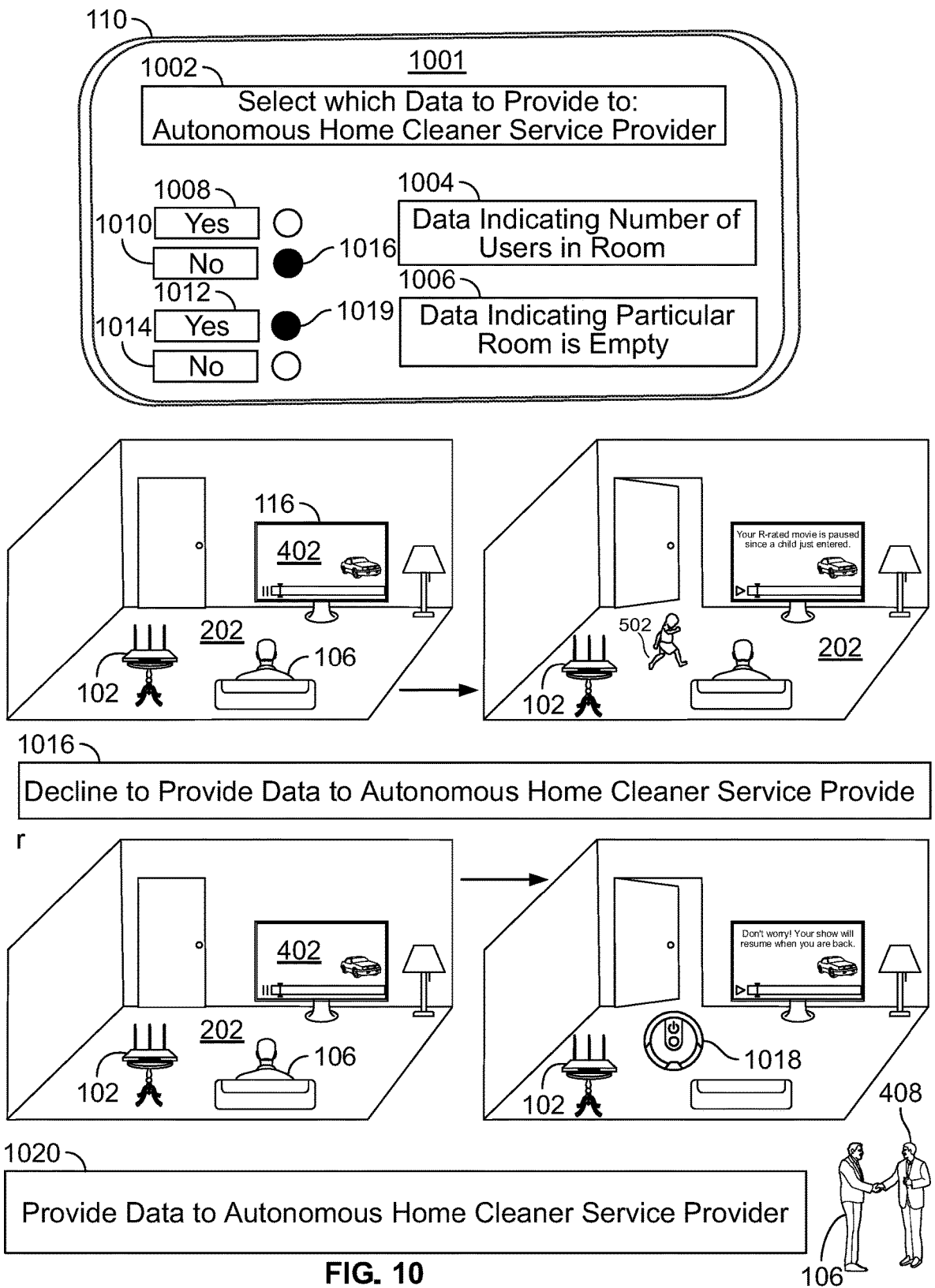
FIG. 10 shows an illustrative system for transmitting wireless signal characteristics to a service provider based on an authorization level of the service provider, in accordance with some embodiments of this disclosure.

FIG. 10 shows an illustrative system for transmitting wireless signal characteristics to a service provider based on an authorization level of the service provider, in accordance with some embodiments of this disclosure. The wireless sensing application may provide, e.g., on consumption device 110, interface 1001 to enable user 106 to specify an amount and/or which types of data may be shared with a particular service provider (e.g., an autonomous home cleaner service provider, as specified as portion 1002 at interface 1001). In some embodiments, interface 1001 may be provided by the particular service provider, where user selections at interface 1001 may be communicated to the wireless sensing application (e.g., running at least in part at analytics server 118).

Interface 1001 may comprise options 1004 and 1006, corresponding to options to provide different levels of data to the particular service provider. For example, option 1004 may be associated with notifying the particular service provider of a number of users detected in living room 202 based on wireless signal characteristics of wireless signals transmitted between router 102 and consumption device 116. Option 1006 may be associated with notifying the particular service provider when a living room 202 is empty. In some embodiments, option 1006 may be a default or recommended option, since it may be desirable to share less information with the service provider while still providing a certain amount of information to improve the ability of the service provider to provide its corresponding service (e.g., autonomous cleaning). For example, autonomous cleaning device 1018 may be configured to be a self-operating vacuum cleaner that navigates a room to clean up dust and debris, and autonomous cleaning device 1018 may wait until a room is empty to perform cleaning so as not to disrupt a viewing session of media asset 402 in living room 202. Thus, it may not be necessary for autonomous cleaning device 1018 to receive information regarding how many users are in a particular room, but rather whether the room is empty or not may be sufficient. In some embodiments, a service provider may be permitted to access certain data in connection with a particular user, but may not be permitted to access such data in connection with another user, and interface 1001 may receive selections in association with such settings.

In the example of FIG. 10, option 1004 may be de-selected, by virtue of user selection of selection 1016 corresponding to indication 1010 ("No") rather than indication 1008 ("Yes") in relation to option 1004. On the other hand, option 1006 may be selected, by virtue of user selection of selection 1019 corresponding to indication 1012 ("Yes") rather than indication 1014 ("No") in relation to option 1006. Thus, in the example of the upper portion of FIG. 10, when the wireless signal-sensing application detects the entry of another user 502 into living room 202 in addition to user 106, such information may not be provided to the autonomous cleaning service, as indicated at 1016. On the other hand, in the example of the upper portion of FIG. 10, when the wireless signal-sensing application detects the exit of user 106 (e.g., due to user 106 answering the door and speaking with neighbor 408), and the absence of any users in living room 202, such information may be provided to the autonomous cleaning service, as indicated at 1020, and based on user selection 1019.

As another example, it may be unnecessary to provide certain service providers (e.g., a media content provider) with wireless signal characteristics and user presence information from a particular room. For example, bathroom 210 of map 200 may not be associated with any consumption devices, and thus the media application may have no use for data from this particular room. Thus, computing resources may be conserved by declining to include bathroom 210 in map 200 and refraining from generating wireless signal characteristics for bathroom 210 and refraining from providing such data to the media content provider. On the other hand, it may be desirable to provide certain service providers (e.g., a home security system) with wireless signal characteristics and map data for each room in a household, to monitor the household for activity indicative of an intruder.

Figure 11:
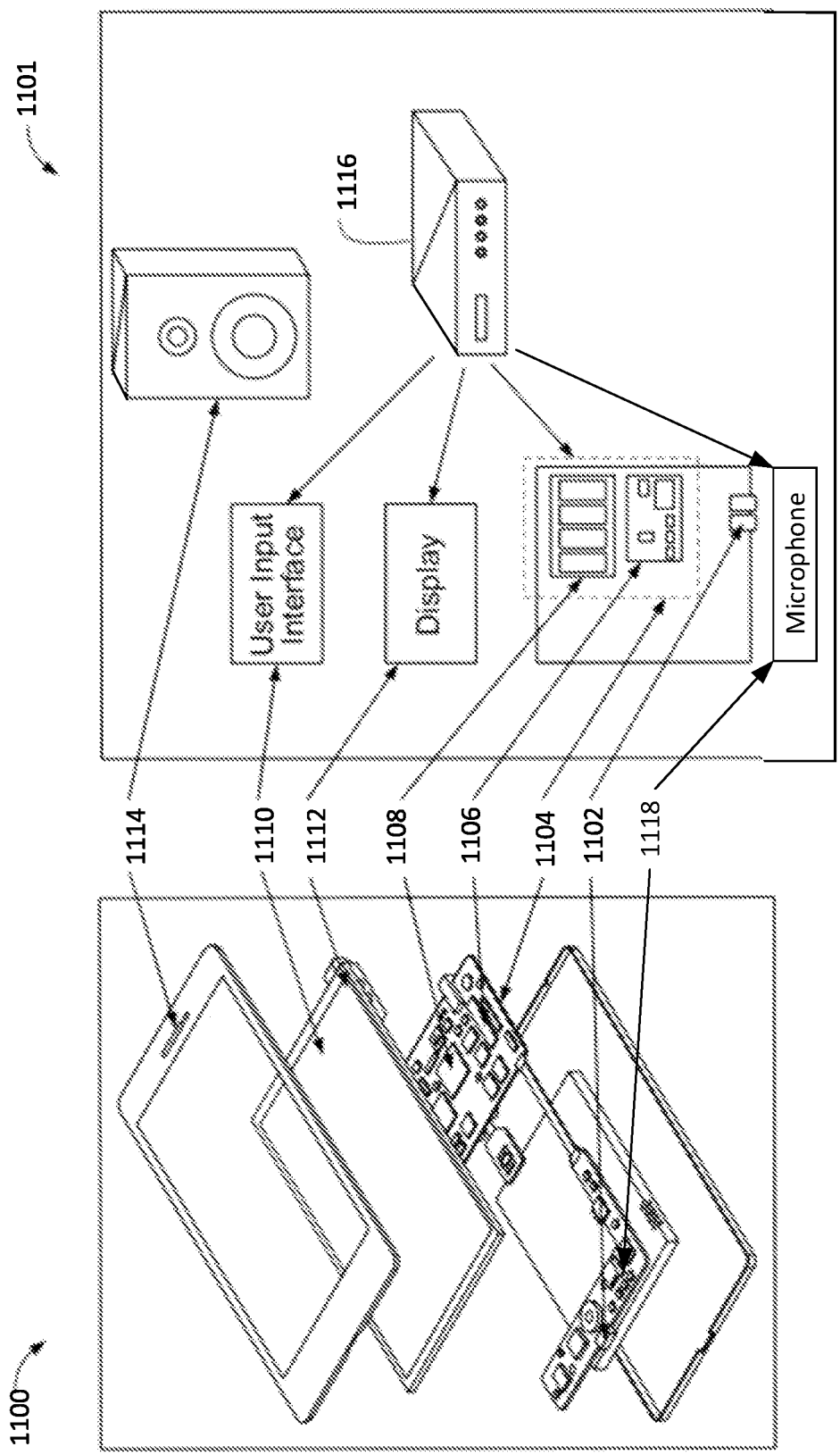
FIG. 11 shows an illustrative consumption device, in accordance with some embodiments of this disclosure.
Figure 12:
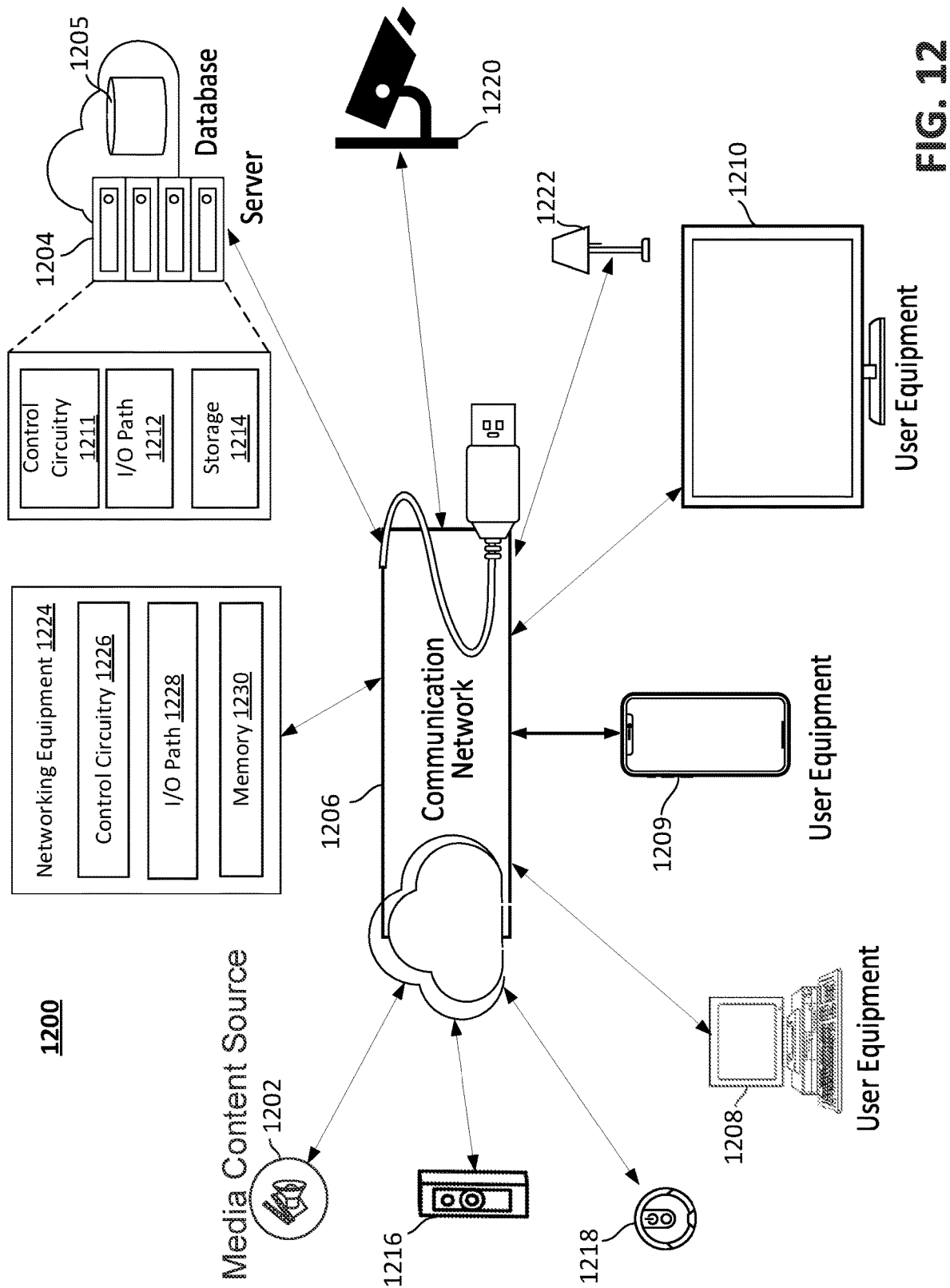
FIG. 12 shows a system for determining user presence information, in accordance with some embodiments of this disclosure.

FIGS. 11-12 describe illustrative devices, systems, servers, and related hardware for determining user presence information, in accordance with some embodiments of the present disclosure. FIG. 11 shows generalized embodiments of illustrative consumption devices 1100 and 1101, which may correspond to, e.g., consumption devices 110, 112, 114, 116, 616. For example, consumption device 1100 may be a smartphone device. In another example, consumption device 1101 may be a user television equipment system or device. User television equipment device 1101 may include set-top box 1116. Set-top box 1116 may be communicatively connected to microphone 1118, speaker 1114, and display 1112. In some embodiments, microphone 1118 may receive voice commands for the media application. In some embodiments, display 1112 may be a television display or a computer display. In some embodiments, set-top box 1116 may be communicatively connected to user input interface 1110. In some embodiments, user input interface 1110 may be a remote control device. Set-top box 1116 may include one or more circuit boards. In some embodiments, the circuit boards may include control circuitry, control circuitry, and storage (e.g., RAM, ROM, hard disk, removable disk, etc.). In some embodiments, the circuit boards may include an input/output path. More specific implementations of user equipment devices are discussed below in connection with FIG. 12. Each one of user equipment device 1100 and user equipment device 1101 may receive content and data via input/output (I/O) path 1102. I/O path 1102 may provide content (e.g., broadcast programming, on-demand programming, Internet content, content available over a local area network (LAN) or wide area network (WAN), and/or other content) and data to control circuitry 1104, which includes processing circuitry 1106 and storage 1108. Control circuitry 1104 may be used to send and receive commands, requests, and other suitable data using I/O path 1102, which may comprise I/O circuitry. I/O path 1102 may connect control circuitry 1104 (and specifically processing circuitry 1106) to one or more communications paths (described below). I/O functions may be provided by one or more of these communications paths, but are shown as a single path in FIG. 11 to avoid overcomplicating the drawing.

Control circuitry 1104 may be based on any suitable control circuitry such as processing circuitry 1106. As referred to herein, control circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or super-computer. In some embodiments, control circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 1104 executes instructions for the media application stored in memory (e.g., storage 1108). Specifically, control circuitry 1104 may be instructed by the media application to perform the functions discussed above and below. In some implementations, any action performed by control circuitry 1104 may be based on instructions received from the media application.

In client/server-based embodiments, control circuitry 1104 may include communications circuitry suitable for communicating with a media application server or other networks or servers. The instructions for carrying out the above mentioned functionality may be stored on a server (which is described in more detail in connection with FIG. 12). Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communication networks or paths (which is described in more detail in connection with FIG. 12). In addition, communications circuitry may include circuitry that enables peer-to-peer communication of user equipment devices, or communication of user equipment devices in locations remote from each other (described in more detail below).

Memory may be an electronic storage device provided as storage 1108 that is part of control circuitry 1104. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 1108 may be used to store various types of content described herein as well as wireless signal-sensing application and/or media application data described above. Non-volatile memory may also be used (e.g., to launch a boot-up routine and other instructions). Cloud-based storage, described in relation to FIG. 11, may be used to supplement storage 1108 or instead of storage 1108.

Control circuitry 1104 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 1104 may also include scaler circuitry for upconverting and downconverting content into the preferred output format of user equipment 1100. Control circuitry 1104 may also include digital-to-analog converter circuitry and analog-to-digital converter circuitry for converting between digital and analog signals. The tuning and encoding circuitry may be used by user equipment device 1100, 1101 to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 1108 is provided as a separate device from user equipment device 1100, the tuning and encoding circuitry (including multiple tuners) may be associated with storage 1108.

Control circuitry 1104 may receive instruction from a user by way of user input interface 1110. User input interface 1110 may be any suitable user interface, such as a remote control, mouse, trackball, keypad, keyboard, touch screen, touchpad, stylus input, joystick, voice recognition interface, or other user input interfaces. Display 1112 may be provided as a stand-alone device or integrated with other elements of each one of user equipment device 1100 and user equipment device 1101. For example, display 1112 may be a touchscreen or touch-sensitive display. In such circumstances, user input interface 1110 may be integrated with or combined with display 1112. Display 1112 may be one or more of a monitor, a television, a display for a mobile device, or any other type of display. A video card or graphics card may generate the output to display 1112. The video card may be any control circuitry described above in relation to control circuitry 1104. The video card may be integrated with control circuitry 1104. Speakers 1114 may be provided as integrated with other elements of each one of user equipment device 1100 and user equipment system 1101 or may be stand-alone units. The audio component of videos and other content displayed on display 1112 may be played through the speakers 1114. In some embodiments, the audio may be distributed to a receiver (not shown), which processes and outputs the audio via speakers 1114.

The wireless signal-sensing application and/or media application may be implemented using any suitable architecture. For example, it may be a stand-alone application wholly-implemented on each one of user equipment device 1100 and user equipment device 1101. In such an approach, instructions of the application are stored locally (e.g., in storage 1108), and data for use by the application is downloaded on a periodic basis (e.g., from an out-of-band feed, from an Internet resource, or using another suitable approach). Control circuitry 1104 may retrieve instructions of the application from storage 1108 and process the instructions to provide supplemental content as discussed. Based on the processed instructions, control circuitry 1104 may determine what action to perform when input is received from user input interface 1110. For example, movement of a cursor on a display up/down may be indicated by the processed instructions when user input interface 1110 indicates that an up/down button was selected.

In some embodiments, the media application is a client/server-based application. Data for use by a thick or thin client implemented on each one of user equipment device 1100 and user equipment device 1101 is retrieved on-demand by issuing requests to a server remote to each one of user equipment device 1100 and user equipment device 1101. In one example of a client/server-based guidance application, control circuitry 1104 runs a web browser that interprets web pages provided by a remote server. For example, the remote server may store the instructions for the application in a storage device. The remote server may process the stored instructions using circuitry (e.g., control circuitry 1104) to perform the operations discussed in connection with FIGS. 1-10.

In some embodiments, the wireless signal-sensing application may be downloaded and interpreted or otherwise run by an interpreter or virtual machine (run by control circuitry 1104). In some embodiments, the wireless signal-sensing application may be encoded in the ETV Binary Interchange Format (EBIF), received by control circuitry 1104 as part of a suitable feed, and interpreted by a user agent running on control circuitry 1104. For example, the wireless signal-sensing application may be an EBIF application. In some embodiments, the wireless signal-sensing application may be defined by a series of JAVA-based files that are received and run by a local virtual machine or other suitable middleware executed by control circuitry 1104. In some of such embodiments (e.g., those employing MPEG-2 or other digital media encoding schemes), the wireless signal-sensing application may be, for example, encoded and transmitted in an MPEG-2 object carousel with the MPEG audio and video packets of a program.

FIG. 12 is a diagram of an illustrative system 1200 for determining user presence information, in accordance with some embodiments of this disclosure. User equipment devices 1208, 1209, 1210 (e.g., which may correspond to one or more of consumption devices 110, 112, 114, 116, 118, 616, 500, 501) may be coupled to communication network 1206. Communication network 1206 may be one or more networks including the Internet, a mobile phone network, mobile voice or data network (e.g., a 5G, 4G, or LTE network), cable network, public switched telephone network, or other types of communication network or combinations of communication networks. Paths (e.g., depicted as arrows connecting the respective devices to the communication network 1206) may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. Communications with the client devices may be provided by one or more of these communications paths but are shown as a single path in FIG. 12 to avoid overcomplicating the drawing.

Although communications paths are not drawn between user equipment devices, these devices may communicate directly with each other via communications paths as well as other short-range, point-to-point communications paths, such as USB cables, IEEE 1394 cables, wireless paths (e.g., Bluetooth, infrared, IEEE 702-11x, etc.), or other short-range communication via wired or wireless paths. The user equipment devices may also communicate with each other directly through an indirect path via communication network 1206.

System 1200 may comprise media content source 1202; server 1204; one or more IOT devices 1216, 1218, 1220, 1222; and networking equipment 1224. Server 1204 may correspond to analytics server 118, and may comprise or be associated with database 1205. Communications with media content source 1202 and server 1204 may be exchanged over one or more communications paths but are shown as a single path in FIG. 12 to avoid overcomplicating the drawing. In addition, there may be more than one of each of media content source 1202 and server 1204, but only one of each is shown in FIG. 12 to avoid overcomplicating the drawing. If desired, media content source 1202 and server 1204 may be integrated as one source device. IOT device 1216, 1218, 1220, 1222 (which may correspond to IOT devices 108, 118, 119, 122, 124, 126) may include any of a plurality of devices in a user's home or other location (e.g., a light controller, washing machine, security camera, a Wi-Fi plug, a smart doorbell, a smart lamp, an autonomous cleaning device, smart appliance, etc.). Networking equipment 1224 may correspond to, e.g., one or more of router 102, access points 104, 105, 107, configured to enable devices within a particular location (e.g., a household of a user, a school, a place of business or other organization, etc.) to access communication network 1206 (e.g., by way of a WLAN). Networking equipment 1224 may comprise control circuitry 1226, I/O path 1228, and memory 1230, and any other suitable components. In some embodiments, the wireless signal-sensing application may be executed at one or more of control circuitry 1226 of networking equipment 1224 and control circuitry 1211 of server 1204 (and/or control circuitry of user equipment devices 1208, 1209, 1210 and/or control circuitry of devices 1216, 1218, 1220, 122).

In some embodiments, server 1204 may be a virtual software element running on networking equipment 1224 or at a backend server associated with a server of a Cable or IPTV company. In some embodiments, the media application may be a virtual software element running on a consumption device and/or a SVOD/AVOD/FVOD backend server. In some embodiments, system 1200 may comprise an supplemental content server (and/or media content source 1202 may comprise an supplemental content server), and such supplemental content server may be deployed directly with the media application separately at a SVOD/AVOD/FVOD backend server or may be bespoke as part of a Real Time Bidding platform. Based on notifications received from the server 1204, the media application may collect statistics about the particular streaming session and the user profile associated with the session, e.g., regarding how many times the presentation of the media asset associated with the session was modified (e.g., paused/stopped), such as, for example, due to the wireless signal-sensing application determining the user exited the vicinity of the consumption device. In addition, statistics regarding a number of users present during a particular session, a total duration of an entire streaming session (e.g., per episode, per movie, per program, etc.) including modifications to the presentation of the media asset due to detecting the absence of the user in a vicinity of the consumption device. In some embodiments, such collected data may be granular, e.g., based on the day of the week, time within the day, month (e.g., summer vs. winter), and the stats may be sent to the supplemental content server to optimize future serving of advertisements for the particular user and/or location (e.g., household).

In some embodiments, server 1204 may include control circuitry 1211 and a storage 1214 (e.g., RAM, ROM, Hard Disk, Removable Disk, etc.). Storage 1214 may store one or more databases. Server 1204 may also include an input/output path 1212. I/O path 1212 may provide device information, or other data, over a local area network (LAN) or wide area network (WAN), and/or other content and data to control circuitry 1211, which includes control circuitry, and storage 1214. Control circuitry 1211 may be used to send and receive commands, requests, and other suitable data using I/O path 1212, which may comprise I/O circuitry. I/O path 1212 may connect control circuitry 1204 (and specifically control circuitry) to one or more communications paths.

Control circuitry 1211 may be based on any suitable control circuitry such as one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, control circuitry 1211 may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 1211 executes instructions for an emulation system application stored in memory (e.g., the storage 1214). Memory may be an electronic storage device provided as storage 1214 that is part of control circuitry 1211.

In some embodiments, server 1204 may retrieve guidance data from media content source 1202, process the data as will be described in detail below, and forward the data to user equipment devices 1208, 1209, 1210. Media content source 1202 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Media content source 1202 may be the originator of content (e.g., a television broadcaster, a Webcast provider, etc.) or may not be the originator of content (e.g., an on-demand content provider, an Internet provider of content of broadcast programs for downloading, etc.). Media content source 1202 may include cable sources, satellite providers, on-demand providers, Internet providers, over-the-top content providers, or other providers of content. Media content source 1202 may also include a remote media server used to store different types of content (including video content selected by a user), in a location remote from any of the client devices. Media content source 1202 may also provide supplemental content relevant to the metadata of a particular scene of a media asset as described above.

Client devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices (such as, e.g., server 1204), which may be located centrally or at distributed locations, that provide cloud-based services to various types of users and devices connected via a network such as the Internet via communication network 1206. In such embodiments, user equipment devices may operate in a peer-to-peer manner without communicating with a central server.

Figure 13:
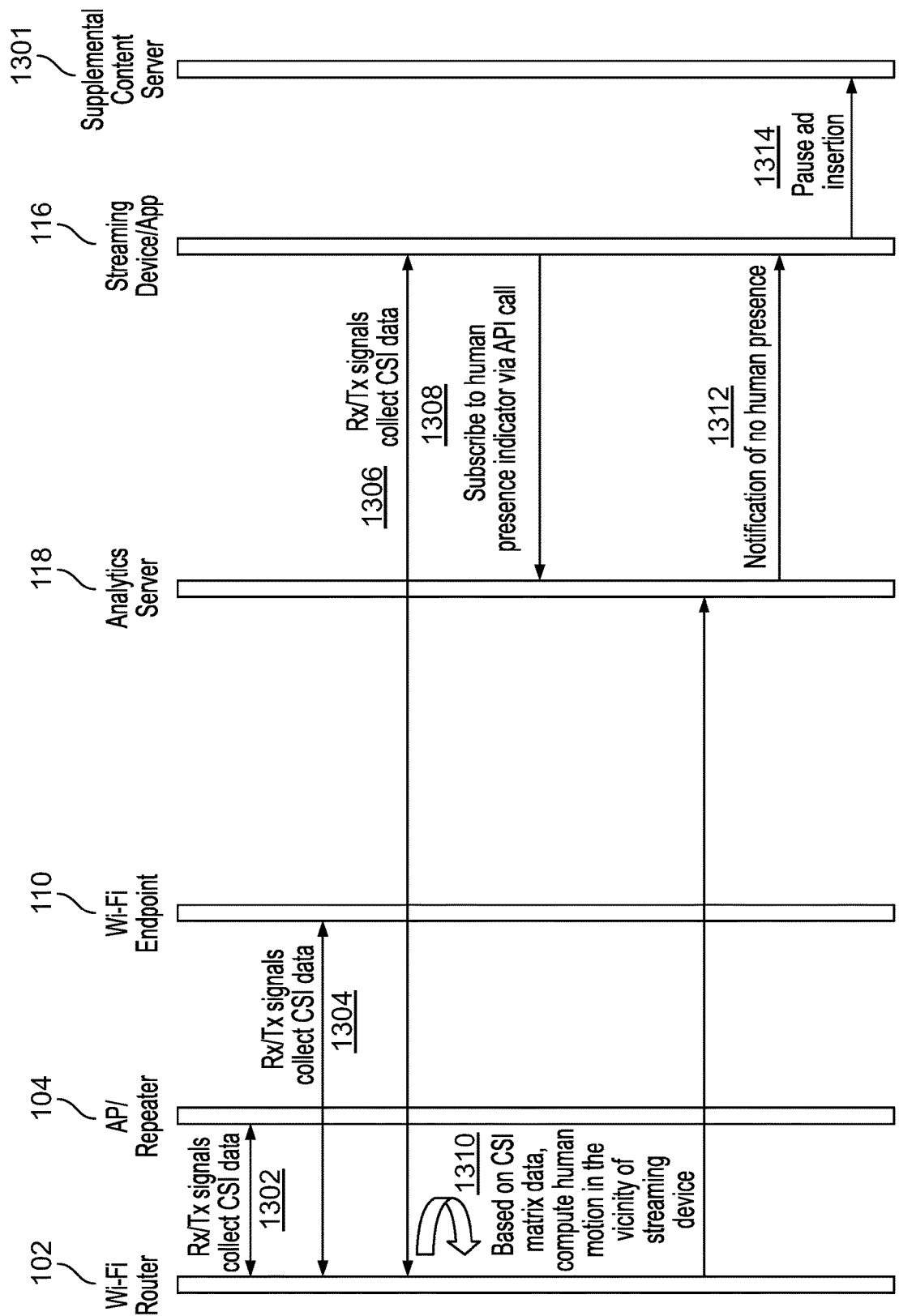
FIG. 13 is a flowchart of a detailed illustrative process for determining user presence information, in accordance with some embodiments of this disclosure.

FIG. 13 is a flowchart of a detailed illustrative process for determining user presence information, in accordance with some embodiments of this disclosure. In various embodiments, the individual steps of process 1300 may be implemented by one or more components of the devices and systems of FIGS. 1-12. Although the present disclosure may describe certain steps of process 1300 (and of other processes described herein) as being implemented by certain components of the devices and systems of FIGS. 1-12, this is for purposes of illustration only, and it should be understood that other components of the devices and systems of FIGS. 1-12 may implement those steps instead.

At 1302, control circuitry of networking equipment (e.g., control circuitry 1226 of networking equipment 1224, which may correspond to router 102 of FIG. 1) may implement the wireless signal-sensing application and may receive wireless signals from access points (e.g., access point 104, access point 105) within a localized network (e.g., the Wi-Fi home network of FIG. 1). The access points may be in communication with devices within the localized network (e.g., consumption devices 110, 112, 116 of FIG. 1 and IOT device 108 of FIG. 1), and the wireless signals may be associated with transmitting antennas (Tx) and receiving antennas (Rx) pairs of the devices within the network. Based on the received wireless signals, control circuitry 1226 of networking equipment 1224 may determine CSI data.

At 1304 and 1306, control circuitry 1226 of networking equipment 1224 may receive wireless signals associated with transmitting antenna (Tx) and receiving antenna (Rx) pairs of devices within the localized network (e.g., consumption devices 110, 112, 116 of FIG. 1 and IOT device 108 of FIG. 1). Based on the received wireless signals, control circuitry 1226 of networking equipment 1224 may determine CSI data.

Based on the CSI data received at 1302, 1304, and 1306, control circuitry 1226 of networking equipment 1224 (and/or control circuitry 1211 of server 1204 of FIG. 12, which may correspond to analytics server 118) may build a list of connected devices and any motion detected within the localized network (e.g., associated with a household of user 106 of FIG. 1), and may determine a baseline of activity (e.g., streaming traffic) associated with the localized network. Within the list of connected devices, the control circuitry may identify and classify each device, e.g., the control circuitry may identify which devices are consumption devices, and what type of consumption device, based on the speed at which content is streamed, and/or other characteristics. The control circuitry may generate a map (e.g., map 200 of FIG. 2) based on a determined initial state, location and list of the connected devices, indicative of a location of consumption devices with respect to the networking equipment in the building or area. In some embodiments, the map may be generated based on one or more database records comprising CSI data (e.g., information stored in the data structure 300 of FIG. 3). In some embodiments, the control circuitry may initialize user presence within a vicinity of the identified network-connected devices and generate user profiles (e.g., indicated in category 318 of table 316) for such users.

At 1308, control circuitry (e.g., control circuitry 1104) of a consumption device (e.g., TV 116 of FIG. 1), which may be implementing a media application, may subscribe to user presence information, e.g., by way of an API call to analytics server 118 (e.g., in communication with router 102).

At 1310, using a time series of the wireless signal characteristics (e.g., RSSI and CSI data) determined by router 102 (and/or analytics server 118) based on data transmitted from access points, consumption devices, and/or IOT devices in the localized network, user presence and/or human motion information in a vicinity of consumption devices may be computed. For example, control circuitry of networking equipment (e.g., control circuitry 1226 of networking equipment 1224) may determine user presence information that user 106 has exited a vicinity of consumption device 116 based on the wireless signal characteristics, as shown in the example of FIG. 4.

At 1312, router 102 (and/or analytics server 118) may transmit a notification of no human presence in a vicinity of consumption device 116, based on the media application running at least in part on consumption device 116 having subscribed to such notifications and based on the computation at 1310.

At 1314, the wireless signal-sensing application, and/or the media application running at least in part on consumption device 116, may transmit an indication to supplemental content server 1301 to modify presentation of supplement content. For example, the indication may convey to the advertisement server that the user is not present in the vicinity of consumption device 116, and thus supplemental content server 1301 should refrain from transmitting, or otherwise stop or pause the presentation of, supplemental content.

Figure 14:
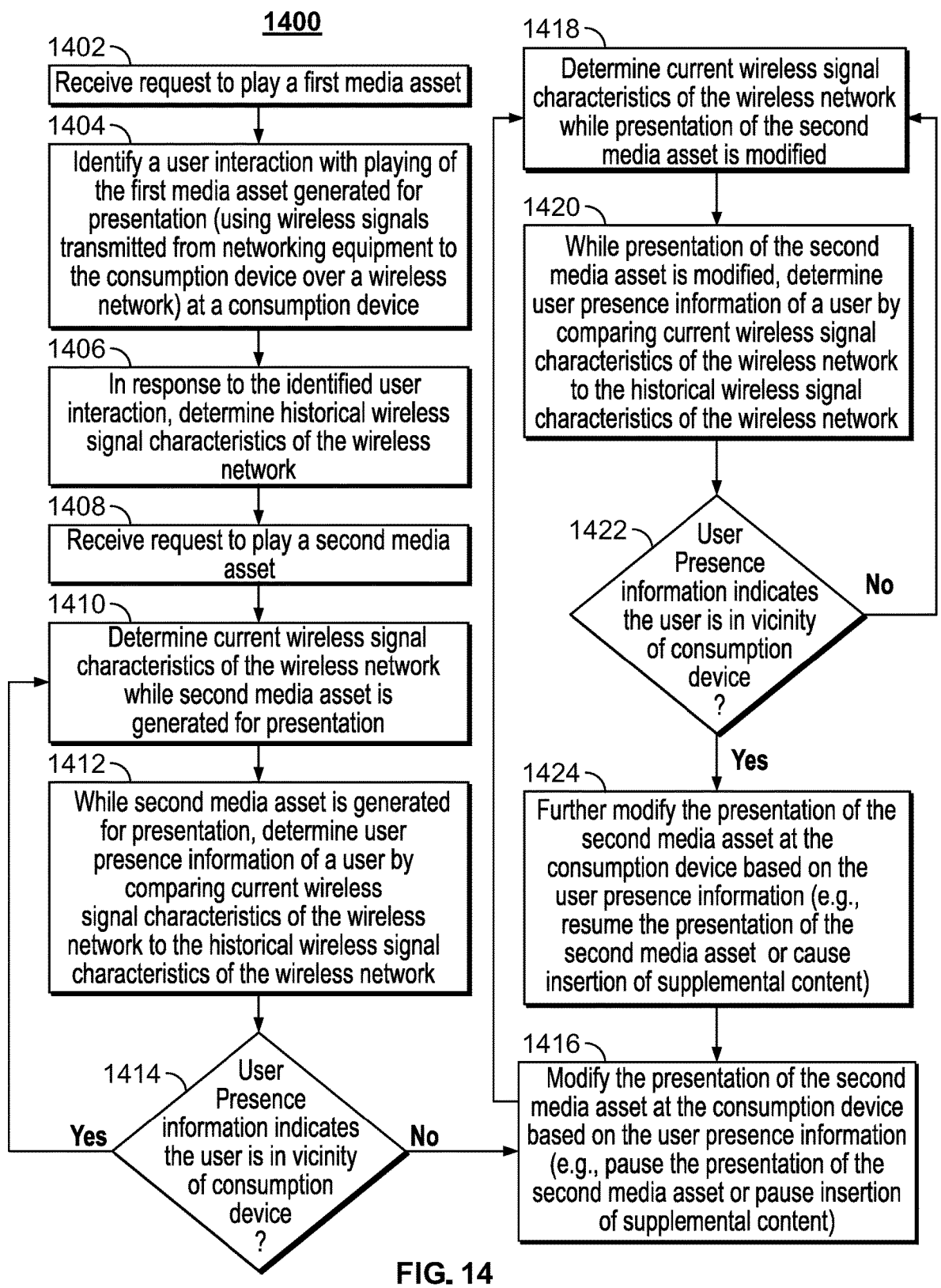
FIG. 14 is a flowchart of a detailed illustrative process for determining user presence information, in accordance with some embodiments of this disclosure.

FIG. 14 is a flowchart of a detailed illustrative process for determining user presence information, in accordance with some embodiments of this disclosure. In various embodiments, the individual steps of process 1400 may be implemented by one or more components of the devices and systems of FIGS. 1-12. Although the present disclosure may describe certain steps of process 1300 (and of other processes described herein) as being implemented by certain components of the devices and systems of FIGS. 1-12, this is for purposes of illustration only, and it should be understood that other components of the devices and systems of FIGS. 1-12 may implement those steps instead.

At 1402, a consumption device (e.g., TV 116 of FIG. 1, executing a media application) may receive a request to play a first media asset at a first time. In response to the request, the first media asset may be caused to be generated for display at the consumption device. In some embodiments, the first media asset may be generated for presentation using wireless signals transmitted from networking equipment (e.g., router 102, access point 104, access point 105) to the consumption device over a wireless network (e.g., a home Wi-Fi network).

At 1404, control circuitry (e.g., control circuitry 1104) of the consumption device (e.g., device 1101 of FIG. 1) may identify a user interaction with playing of the first media asset. For example, the control circuitry may identify a command from a user (e.g., user 106 of FIG. 1), such as a command to pause the first media asset, a command to change a channel associated with the first media asset or to cause presentation of a different media asset from the same or different media content source (e.g., media content source 1202 of FIG. 12), a fast-forward or rewind command, or any other suitable user interaction.

At 1406, in response to the identified user interaction, the control circuitry may determine historical wireless signal characteristics of the wireless network (e.g., at the time of the user interaction). For example, the media application (e.g., running at consumption device 116) may transmit an indication to networking equipment (e.g., control circuitry 1226 of networking equipment 1224 of FIG. 12, or to server 1204 of FIG. 12) that a user interaction was received, and the networking equipment may store an indication of the wireless signal characteristics and that such wireless signal characteristics correspond to a time when a user was in a vicinity of the consumption device (e.g., based on the inference that since a command was received at consumption device, the user was within a predefined vicinity of the consumption device). In some embodiments, a user profile associated with the viewing session of the first media asset may be identified and associated with the determined wireless signal characteristics.

At 1408, control circuitry (e.g., control circuitry 1104) of the consumption device (e.g., device 1101 of FIG. 1) may receive request to play a second media asset (e.g. media asset 402) at second time (e.g., later than the first time at which the first media asset is requested and interacted with).

At 1410, control circuitry (e.g., control circuitry 1226 of networking equipment 1224 of FIG. 12) may determine current wireless signal characteristics of the wireless network while second media asset (e.g. media asset 402) is generated for presentation at the consumption device (e.g., device 1101 of FIG. 1). For example, the control circuitry may determine CSI data and/or RSSI data associated with the consumption session of the second media asset.

At 1412, while the second media asset is generated for presentation, the control circuitry (e.g., control circuitry 1226 of networking equipment 1224 of FIG. 12) may determine user presence information of a user by comparing current wireless signal characteristics of the wireless network (e.g., identified during the presentation of the second media asset) to the historical wireless signal characteristics of the wireless network (e.g., associated with the consumption session of the first media asset). In some embodiments, the historical wireless signal characteristics may comprise any suitable number of sets of characteristics from prior consumption sessions, associated with the particular physical location (e.g., household of user 106).

At 1414, the control circuitry (e.g., control circuitry 1226 of networking equipment 1224 of FIG. 12 and/or control circuitry 1211 of server 1204) may determine whether the user presence information indicates the user (e.g., user 106 of FIG. 1) is in the vicinity of consumption device (e.g., TV 116 of FIG. 1). In some embodiments, this determination may be made based on an amount of similarity or similarity score between the current wireless signal characteristics and a particular set of historical wireless signal characteristics associated with an indication that the user is absent from a vicinity of the consumption device or is present in the vicinity of the consumption device (e.g., a heuristic-based analysis). In some embodiments one or more machine learning models (e.g., machine learning model 800 of FIG. 8) may be employed in the determination of whether the user presence information indicates the user is in the vicinity of the consumption device.

At 1414, if the control circuitry (e.g., control circuitry 1226 of networking equipment 1224 of FIG. 12 and/or control circuitry 1211 of server 1204) determines the user is in the vicinity of the consumption device (e.g., consumption device 116), processing may return to 1410, to continue monitoring wireless signal characteristics of the consumption session and user presence information. On the other hand, if the control circuitry determines the user is not in the vicinity of the consumption device and the second media asset is being generated for display, at 1415, control circuitry (e.g., of consumption device 116 and/or a remote server) may modify the presentation of the second media asset at the consumption device based on the user presence information (e.g., pause the presentation of the second media asset or pause insertion of supplemental content from supplemental content server 1301). For example, the networking equipment and/or analytics server may transmit an indication to the media application, e.g., associated with media content source 1202 and presenting content on the consumption device, indicating the user presence information.

At 1418, the control circuitry (e.g., control circuitry 1226 of networking equipment 1224 of FIG. 12) may determine current wireless signal characteristics of the wireless network while the second media asset is modified (e.g., paused). At 1420, the control circuitry may determine user presence information of the user (e.g., user 106) by comparing current wireless signal characteristics of the wireless network (e.g., while media asset 402 is paused) to the historical wireless signal characteristics of the wireless network. 1420 may be performed in a similar manner as 1412 to continuously determine user presence information.

At 1422, the control circuitry (e.g., control circuitry 1226 of networking equipment 1224 of FIG. 12) may determine whether the user presence information indicates the user (e.g., user 106 of FIG. 1) is in a vicinity of the consumption device (e.g., TV 116 of FIG. 1). If the user presence information indicates the user is not in the vicinity of (e.g., remains absent from the vicinity of) the consumption device, processing may return to 1418 to continue monitoring the surrounding environment of the consumption device. On the other hand, if the user presence indicates the user has returned to be within the vicinity of the consumption device, processing may proceed to 1424.

At 1424, control circuitry (e.g., of consumption device 116 and/or a remote server) may modify the presentation of the second media asset at the consumption device based on the user presence information (e.g., resume the presentation of the second media asset or cause insertion of supplemental content). For example, the networking equipment and/or analytics server may transmit an indication to the media application, e.g., associated with media content source 1202 and presenting content on the consumption device, indicating the user presence information.

Figure 15:
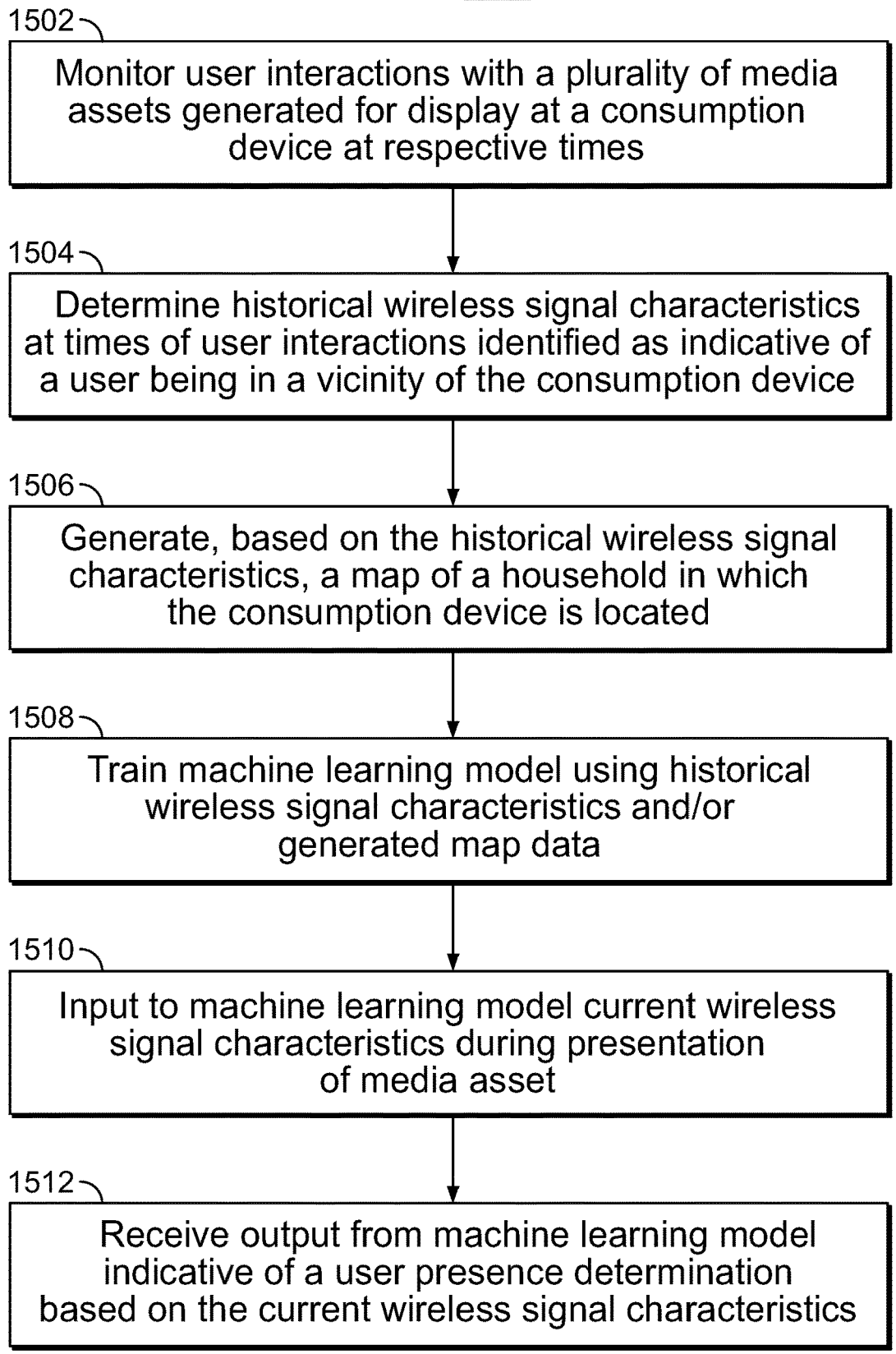
FIG. 15 is a flowchart of a detailed illustrative process for using a machine learning model to determine user presence information, in accordance with some embodiments of this disclosure.

FIG. 15 is a flowchart of a detailed illustrative process for using a machine learning model to determine user presence information, in accordance with some embodiments of this disclosure. In various embodiments, the individual steps of process 1500 may be implemented by one or more components of the devices and systems of FIGS. 1-12. Although the present disclosure may describe certain steps of process 1500 (and of other processes described herein) as being implemented by certain components of the devices and systems of FIGS. 1-12, this is for purposes of illustration only, and it should be understood that other components of the devices and systems of FIGS. 1-12 may implement those steps instead.

At 1502, control circuitry (e.g., control circuitry of consumption device 116 of FIG. 1 implementing a media application) may monitor user interactions with a plurality of media assets generated for display at a consumption device (e.g., TV 116) at respective times. For example, each time a media asset is consumed at a particular consumption device, the control circuitry may determine information related to times when user commands (e.g., pause, channel changes) are received.

At 1504, the control circuitry (e.g., control circuitry 1226 of networking equipment 1224 of FIG. 12) may determine historical wireless signal characteristics at the times of user interactions identified as indicative of a user being in a vicinity of the consumption device (e.g., TV 116). For example, the media application may transmit information related to the times of the user interactions, and the control circuitry may correlate the detected wireless signal characteristics (e.g., detected by router 102 of FIG. 1) with the times of the user interactions, e.g., to identify which sets of wireless signal characteristics (e.g., CSI data) correspond to instances when the user is in the vicinity of the consumption devices, as well as which sets of wireless signal characteristics correspond to instances when the user is not in the vicinity of the consumption device (e.g., if the consumption device is determined to be off; based on information from other sensors indicating the user is in another room such as, for example, a smart lock being interacted within another room, or a fitness device indicating the user is exercising in another room or sleeping, etc.).

At 1506, the control circuitry (e.g., control circuitry 1226 of networking equipment 1224 of FIG. 12 and/or control circuitry 1211 of server 1204 of FIG. 12) may generate, based on the historical and/or current wireless signal characteristics, a map (e.g., map 200 of FIG. 2) of a household in which the consumption device (e.g., consumption device 116 of FIG. 1) is located. For example, map 200 may identify current human presence information in a particular room, locations and statuses of consumption devices, IOT devices, network equipment, certain rooms of the physical network, etc. In some embodiments, map 200 may be generated based on information stored at data structure 300 of FIG. 3.

At 1508, the historical wireless signal characteristics and/or the generated map data may be used (e.g., by control circuitry 1226 of networking equipment 1224 of FIG. 12) to train one or more machine learning models (e.g., machine learning model 800 of FIG. 8). For example, the machine learning model may be trained to recognize patterns and correlations between certain wireless signal characteristics and user presence within a predefined vicinity of a consumption device. In some embodiments, the machine learning model may be trained to recognize certain user characteristics associated with certain user profiles, locations of objects in the household, and may learn to differentiate pets (e.g., a dog) from human users. In some embodiments, the machine learning model may be implemented on the networking equipment and/or a remote server.

At 1510, current wireless signal characteristics (and/or map data), detected during presentation of the media asset (e.g., media asset 402 of FIG. 4) currently being generated for display, may be input to the machine learning model (e.g., machine learning model 800 of FIG. 8). In some embodiments, preprocessing techniques may be employed on the current wireless signal characteristics for input to the machine learning model.

At 1512, control circuitry (e.g., control circuitry 1226 of networking equipment 1224 of FIG. 12, implementing a wireless signal-sensing application) may receive output from the machine learning model indicative of a user presence determination based on the current wireless signal characteristics. In some embodiments, the wireless signal-sensing application (e.g., running on router 102 and/or analytics server 118) may transmit the user presence determination to a media application (e.g., running on consumption device 116 and/or server 1204), and the media application may determine whether to modify presentation of the media asset currently being played based on the user presence information.

Figure 16:
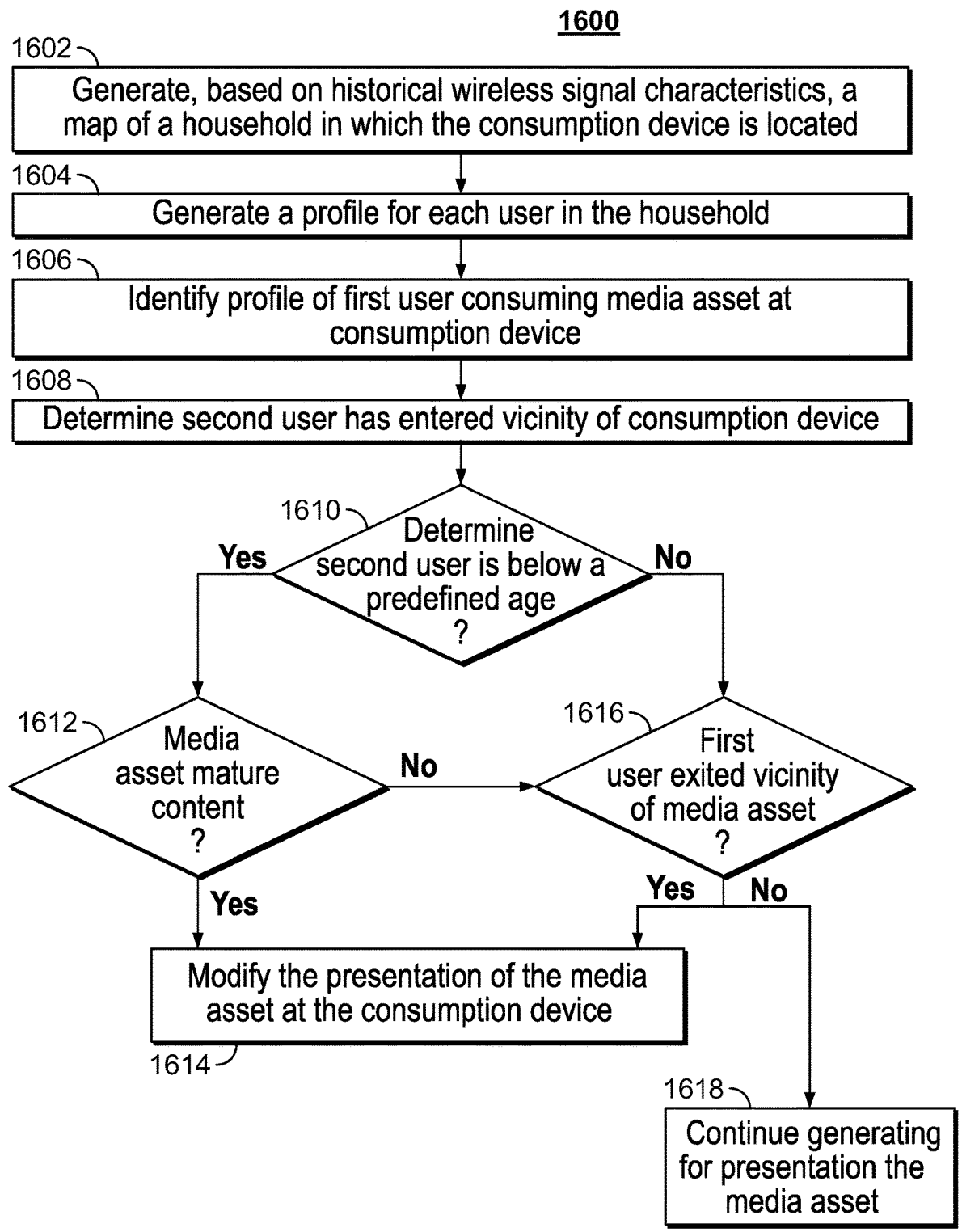
FIG. 16 is a flowchart of a detailed illustrative process for modifying presentation of a media asset based on user presence information, in accordance with some embodiments of this disclosure.

FIG. 16 is a flowchart of a detailed illustrative process for modifying presentation of a media asset based on user presence information, in accordance with some embodiments of this disclosure. In various embodiments, the individual steps of process 1600 may be implemented by one or more components of the devices and systems of FIGS. 1-12. Although the present disclosure may describe certain steps of process 1600 (and of other processes described herein) as being implemented by certain components of the devices and systems of FIGS. 1-12, this is for purposes of illustration only, and it should be understood that other components of the devices and systems of FIGS. 1-12 may implement those steps instead.

At 1602, the control circuitry (e.g., control circuitry 1226 of networking equipment 1224 of FIG. 12 and/or control circuitry 1211 of server 1204 of FIG. 12) may generate, based on the historical and/or current wireless signal characteristics, a map (e.g., map 200 of FIG. 2) of a household in which the consumption device (e.g., consumption device 116 of FIG. 1) is located. For example, map 200 may identify current human presence information in a particular room, locations and statuses of consumption devices, IOT devices, network equipment, certain rooms of the physical network, etc. In some embodiments, map 200 may be generated based on information stored at data structure 300 of FIG. 3.

At 1604, the control circuitry may generate a profile for each user in the household corresponding to the map (e.g., map 200 of FIG. 2). For example, as shown in FIG. 3, historical wireless signal characteristics database 300 may store profiles for a plurality of users in the household (e.g., "User A" in column 318 of table 316, which may correspond to user 106 of FIG. 5; and "User B" in column 318 of table 316, which may correspond to user 502 of FIG. 5). The user profile may be associated with various types of information (e.g., most common consumption locations for each user; current location of a user; certain traits of a user, such as, for example, a gait of a user, height of a user, etc.).

In some embodiments, the control circuitry may determine consumption data (e.g., regarding a number of users present during presentation of the media asset and/or supplemental content, how often content is modified, how often users move out of vicinity of consumption device) based on user presence information. Such consumption data may be associated with a particular user profile or household, and may be provided to optimize and tailor content. For example, the consumption data may be provided to media content providers, which may tailor recommendations of media assets and/or supplemental content based on determined consumption data.

At 1606, the control circuitry may identify a profile of a first user consuming a media asset at consumption device. For example, the control circuitry may determine that the current wireless signal characteristics are indicative of "User A," e.g., user 106 of FIG. 1, when taking into account a height of the user indicated by the wireless signal characteristics and/or based on a comparison of the current wireless signal characteristics to historical wireless signal characteristics associated with that user. In some embodiments, the identity of the user may be determined based on the user logging in to his or her media profile, and/or based on the user being associated with a particular consumption device.

At 1608, the control circuitry may determine that a second user (e.g., user 502) has entered the vicinity of the consumption device, based on wireless signal characteristics of the environment surrounding the consumption device (e.g., TV 116 of FIG. 1). For example, the control circuitry may determine that the height of the second user, as indicated by the wireless signal characteristics, corresponds to "User B" (e.g., user 502 of FIG. 5) as indicated in column 318 of table 316.

At 1610, the control circuitry may determine whether the second user is below a predefined age (e.g., 15 years old). In some embodiments, this may be based on the determined height of the user, e.g., by comparing the determined height of the user to a predefined threshold (e.g., 4 feet), and determining the height indicated in the user profile (e.g., 3'9') is less than the threshold height.

At 1612, if the control circuitry determines at 1610 that the second user is below the predefined age, the control circuitry (e.g., control circuitry 1226 of networking equipment 1224 of FIG. 12 and/or control circuitry 1104 of consumption device 116) may determine whether the media asset (e.g., media asset 402) corresponds to mature content. For example, the control circuitry may determine metadata of a current scene of the media asset or the media asset as a whole may be associated with a particular parent rating (e.g., "R") which is not suitable for users below a certain age.

At 1614, if the control circuitry determines at 1612 that the media asset (e.g., media asset 402), or current portion thereof, is associated with mature content, the control circuitry may cause the modification of the presentation of the media asset at the consumption device. For example, the control circuitry (e.g., of consumption device 116 of FIG. 1) may transmit an instruction to a remote server (e.g., media content source 1202) to pause or stop, or lower the volume of, the media asset (e.g., media asset 402 of FIG. 4). In some embodiments, if the control circuitry determines the second user (e.g., the child user) has exited the vicinity of the consumption device, the control circuitry may further modify the presentation of the media asset.

If the control circuitry determines at 1610 that the second user is not below the predefined age, or determines at 1612 that the media asset does not correspond to mature content, processing may proceed to 1616. At 1616, the control circuitry may determine, based on the current wireless signal characteristics and user presence information, whether the first user (e.g., user 106) has exited the predefined vicinity of the consumption device. If the control circuitry determines that the first user is still within the predefined vicinity of the consumption device, processing may proceed to 1618, where the media asset (e.g., media asset 402 of FIG. 4) may continue to be generated for presentation. On the other hand, if the control circuitry determines that the first user (e.g., user 106 of FIG. 1) has exited the vicinity of the media asset, processing may proceed to 1614. At 1614, the media asset may be, e.g., paused or stopped, and may remain paused or stopped until the control circuitry detects, based on user presence information, that the first user has re-entered the vicinity of the consumption device.

Figure 17:
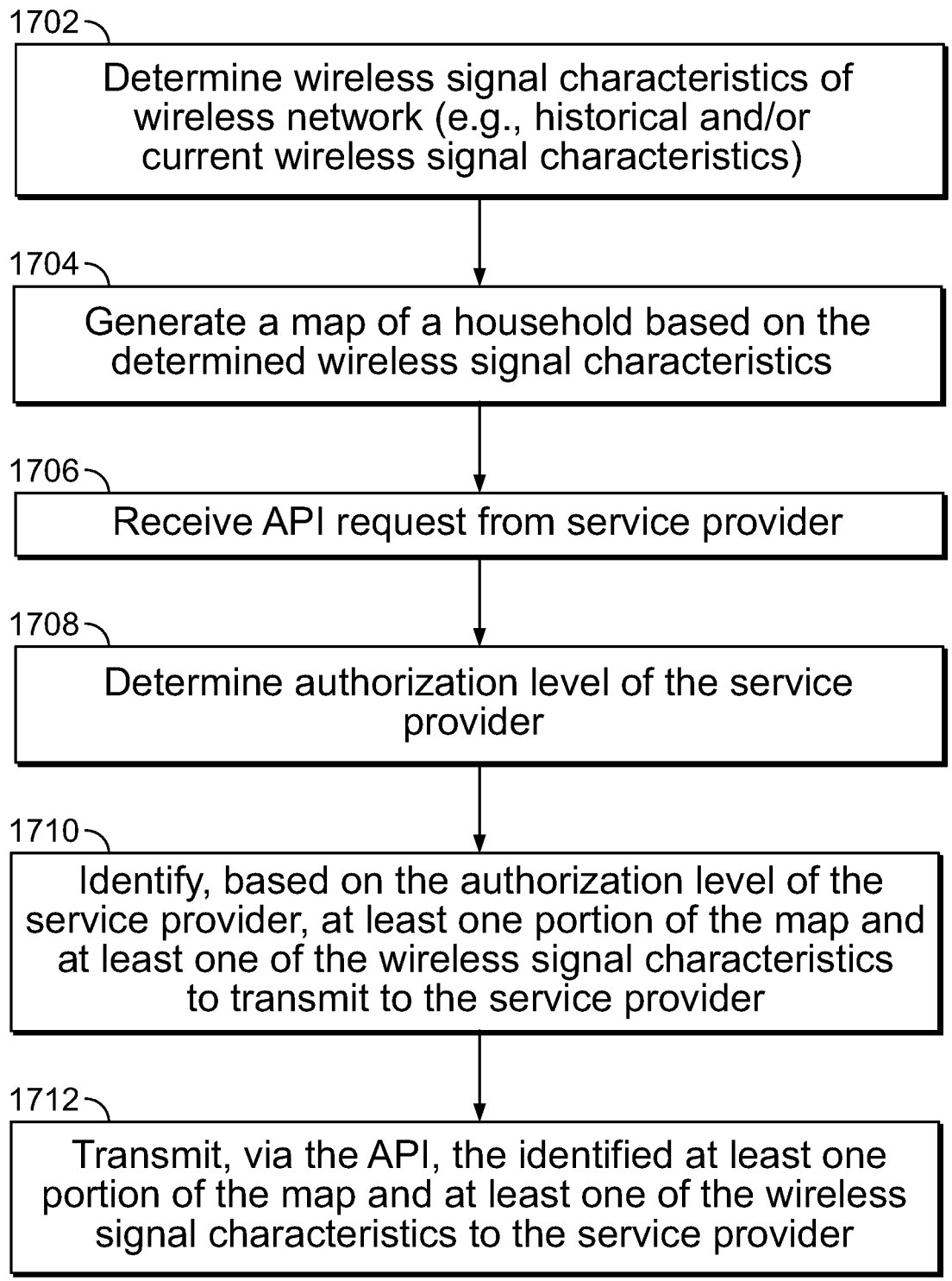
FIG. 17 is a flowchart of a detailed illustrative process for transmitting wireless signal characteristics to a service provider based on an authorization level of the service provider, in accordance with some embodiments of this disclosure.

FIG. 17 is a flowchart of a detailed illustrative process for transmitting wireless signal characteristics to a service provider based on an authorization level of the service provider, in accordance with some embodiments of this disclosure. In various embodiments, the individual steps of process 1700 may be implemented by one or more components of the devices and systems of FIGS. 1-12. Although the present disclosure may describe certain steps of process 1700 (and of other processes described herein) as being implemented by certain components of the devices and systems of FIGS. 1-12, this is for purposes of illustration only, and it should be understood that other components of the devices and systems of FIGS. 1-12 may implement those steps instead.

At 1702, control circuitry (e.g., control circuitry 1226 of networking equipment 1224 of FIG. 12) may determine wireless signal characteristics of a wireless network (e.g., a localized network in a household of user 106). For example, control circuitry may monitor wireless signal characteristics, e.g., CSI data, associated with consumption of media assets generated for display on a plurality of devices within the household, and associated with one or more users of the household. In some embodiments, the wireless signal characteristics may be used to determine user presence information, e.g., whether a particular user is within a predefined vicinity of a consumption device (e.g., television 116 of FIG. 1).

At 1704, the control circuitry (e.g., control circuitry 1226 of networking equipment 1224 of FIG. 12 and/or control circuitry 1211 of server 1204 of FIG. 12) may generate, based on the historical and/or current wireless signal characteristics, a map (e.g., map 200 of FIG. 2) of a household in which the consumption device (e.g., consumption device 116 of FIG. 1) is located. For example, map 200 may identify current human presence information in a particular room, locations and statuses of consumption devices, IOT devices, network equipment, certain rooms of the physical network, etc. In some embodiments, map 200 may be generated based on information stored at data structure 300 of FIG. 3.

At 1706, the control circuitry (e.g., control circuitry 1226 of networking equipment 1224 of FIG. 12 and/or control circuitry 1211 of server 1204 of FIG. 12) may receive an API request from a service provider (e.g., a service provider associated with autonomous cleaning device 1018 of FIG. 10). For example, the API request may comprise a request to access certain wireless signal characteristics information and/or map data from the localized network (e.g., within a household of user 106).

At 1708, the control circuitry (e.g., control circuitry 1226 of networking equipment 1224 of FIG. 12 and/or control circuitry 1211 of server 1204 of FIG. 12) may determine whether the particular service provider is authorized to access the information requested in the API request, e.g., based on an authorization level of the service provider. In some embodiments, the wireless signal-sensing application (e.g., running on the networking equipment 1224 and/or server 1204 of FIG. 12) may determine whether the service provider is authorized to access the information based on the type of services provided by the service provider. For example, the service provider associated with autonomous cleaning device 1018 of FIG. 10 may, according to a default setting, only be permitted access to information regarding the absence of users from a particular room included in map 200, whereas other services (e.g., security services) may additionally be provided access to a number of humans in a particular room. In some embodiments, the control circuitry may determine whether the particular service provider is authorized to access the information requested in the API request based on user selections (e.g., by way of interface 1001 of FIG. 10).

At 1710, the control circuitry (e.g., control circuitry 1226 of networking equipment 1224 of FIG. 12 and/or control circuitry 1211 of server 1204 of FIG. 12) may identify, based on the authorization level of the service provider, at least one portion of the map and at least one of the wireless signal characteristics to transmit to the service provider. For example, for the service provider associated with autonomous cleaning device 1018 of FIG. 10, the control circuitry may identify, based on the determined authorization level for such service provider, that the service provider is permitted to receive map data corresponding to living room 202 and related human presence information indicative of whether any users are present in living room 202, e.g., to enable autonomous cleaning device 1018 to clean living room 202 without colliding with users. However, the control circuitry may determine that the service provider associated with autonomous cleaning device 1018 is not permitted to access user presence information indicative of a number of users in a particular room.

At 1712, the control circuitry (e.g., control circuitry 1226 of networking equipment 1224 of FIG. 12 and/or control circuitry 1211 of server 1204 of FIG. 12) may transmit, via the API, the identified at least one portion of the map and at least one of the wireless signal characteristics to the service provider.

The processes discussed above are intended to be illustrative and not limiting. One skilled in the art would appreciate that the steps of the processes discussed herein may be omitted, modified, combined and/or rearranged, and any additional steps may be performed without departing from the scope of the invention. More generally, the above disclosure is meant to be illustrative and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method comprising:
    monitoring a plurality of user interface inputs, received from a plurality of users, for controlling presentation of media assets generated for display at a consumption device in a household;
    storing a plurality of sets of wireless signal characteristics, wherein each respective set of wireless signal characteristics of the stored plurality of sets of wireless signal characteristics is measured in the household at times when respective user interface inputs of the plurality of user interface inputs are indicative of an identity of a respective user of the plurality of users being in a vicinity of the consumption device;
    training a machine learning model using the stored plurality of sets of wireless signal characteristics, wherein the machine learning model is configured to accept inputted wireless signal characteristics as input and output an indication of which user of the plurality of users in the household is currently present in the vicinity of the consumption device;
    inputting into the machine learning model current wireless signal characteristics measured in the household;
    receiving output from the machine learning model indicating a current presence of a particular user of the plurality of users being in the vicinity of the consumption device; and
    causing the consumption device to perform an action based on the output from the machine learning model indicating the current presence of the particular user of the plurality of users being in the vicinity of the consumption device, wherein the action is based on a profile of the particular user.

2. The method of claim 1, further comprising:
    determining, each time a media asset is consumed at a particular consumption device, information related to times when user commands are received, wherein the user commands comprise at least one of: a command to pause a first media asset, a command to change a channel associated with the first media asset or to cause a presentation of a different media asset from the same or different media content source, a fast-forward or rewind command, or any other suitable user interaction.

3. The method of claim 1, further comprising determining the plurality of sets of wireless signal characteristics based on one or more of: channel state information (CSI), a received signal strength indicator (RSSI) and a received channel power indicator (RCPI).

4. The method of claim 1, wherein causing the consumption device to perform the action based on the output from the machine learning model indicating the current presence of the particular user comprises modifying the presentation of a media asset by at least one of: performing a trick play of a first media asset, pausing a current presentation of the media asset, stopping the current presentation of the media asset, causing a second media asset to be generated for display at an additional consumption device, instructing a server to refrain from providing supplemental content to the consumption device, and adjusting a volume level of the current presentation of the media asset.

5. The method of claim 1, further comprising:
generating a profile for each of the plurality of users in the household; and
in response to receiving output from the machine learning model indicating the current presence of the particular user of the plurality of users being in the vicinity of the consumption device:
determining that the particular user of the plurality of users being in the vicinity of the consumption device is associated with a profile indicating that an age of the particular user is below a predefined age; and
modifying the presentation of a media asset to make the presentation of the media asset more appropriate for the age of the particular user.

6. The method of claim 1, wherein the machine learning model performs continuous human presence detection in the household and extracts human presence information using at least one of the following techniques: density-based spatial clustering, fingerprinting, regression, filter models and threshold detection.

7. The method of claim 1, further comprising:
determining user-specific behavior patterns of the particular user by analyzing at least one of: movement patterns of the particular user, most common rooms in which the particular user consumes content, a most common location in a room in which content is consumed and certain attributes of the particular user based on information contained in a stored profile.

8. The method of claim 1, wherein receiving the output from the machine learning model indicating the current presence of the particular user comprises receiving output indicating that the particular user is in the vicinity of the consumption device or receiving output indicating that the particular user has exited the vicinity of the consumption device.

9. The method of claim 8, wherein causing the consumption device to perform the action based on the received output from the machine learning model indicating the current presence of the particular user comprises performing a different action based on which user of the plurality of users is currently in the vicinity of the consumption device.

10. The method of claim 1, wherein receiving output from the machine learning model indicating the current presence of the particular user comprises comparing the current wireless signal characteristics measured in the household to the stored set of wireless signal characteristics measured in the household.

11. A system comprising:
a memory;
a control circuitry configured to:
monitor a plurality of user interface inputs, received from a plurality of users, for controlling presentation of media assets generated for display at a consumption device in a household;
store, in the memory, a plurality of sets of wireless signal characteristics, wherein each respective set of wireless signal characteristics of the stored plurality of sets of wireless signal characteristics is measured in the household at times when respective user interface inputs of the plurality of user interface inputs are indicative of an identity of a respective user of the plurality of users being in a vicinity of the consumption device;
train a machine learning model using the stored plurality of sets of wireless signal characteristics, wherein the machine learning model is configured to accept inputted wireless signal characteristics as input and output an indication of which user of the plurality of users in the household is currently present in the vicinity of the consumption device;
input into the machine learning model current wireless signal characteristics measured in the household;
receive output from the machine learning model indicating a current presence of a particular user of the plurality of users being in the vicinity of the consumption device; and
an input/output circuitry configured to:
transmit at least one signal to cause the consumption device to perform an action based on the output from the machine learning model indicating the current presence of the particular user of the plurality of users being in the vicinity of the consumption device, wherein the action is based on a profile of the particular user.

12. The system of claim 11, wherein the control circuitry is further configured to:
determine, at each time a media asset is consumed at a particular consumption device, information related to times when user commands are received, and wherein the user commands comprise at least one of: a command to pause a first media asset, a command to change a channel associated with the first media asset or to cause a presentation of a different media asset from the same or different media content source, a fast-forward or rewind command, or any other suitable user interaction.

13. The system of claim 11, wherein the control circuitry is further configured to determine the plurality of sets of wireless signal characteristics based on one or more of: channel state information (CSI), a received signal strength indicator (RSSI) and a received channel power indicator (RCPI).

14. The system of claim 11, wherein the input/output circuitry is configured to cause the consumption device to perform the action based on the output from the machine learning model indicating the current presence of the particular user by modifying the presentation of a media asset to: perform a trick play of a first media asset, pause a current presentation of the media asset, stop the current presentation of the media asset, cause a second media asset to be generated for display at an additional consumption device, instruct a server to refrain from providing supplemental content to the consumption device, and adjust a volume level of the current presentation of the media asset.

15. The system of claim 11, wherein the control circuitry is further configured to:
generate a profile for each of the plurality of users in the household; and
in response to receiving output from the machine learning model indicating the current presence of the particular user of the plurality of users being in the vicinity of the consumption device:
determine that the particular user of the plurality of users being in the vicinity of the consumption device is associated with a profile indicating that an age of the particular user is below a predefined age; and
modify the presentation of a media asset to make the presentation of the media asset more appropriate for the age of the particular user.

16. The system of claim 11, wherein the control circuitry is configured, using the machine learning model, to perform continuous human presence detection in the household and extract human presence information using at least one of the following techniques: density-based spatial clustering, fingerprinting, regression, filter models and threshold detection.

17. The system of claim 11, wherein the control circuitry is further configured to determine user-specific behavior patterns of the particular user by analyzing at least one of: movement patterns of the particular user, most common rooms in which the particular user consumes content, a most common location in a room in which content is consumed and certain attributes of the particular user based on information contained in a stored profile.

18. The system of claim 11, wherein the control circuitry is configured to receive the output from the machine learning model indicating the current presence of the particular user by receiving output indicating that the particular user is in the vicinity of the consumption device or receiving output indicating that the particular user has exited the vicinity of the consumption device.

19. The system of claim 18, wherein the input/output circuitry is configured to cause the consumption device to perform the action based on the output from the machine learning model indicating the current presence of the particular user by performing a different action based on which user of the plurality of users is currently in the vicinity of the consumption device.

20. The system of claim 11, wherein the control circuitry is configured to receive output from the machine learning model indicating the current presence of the particular user by comparing the current wireless signal characteristics measured in the household to the stored set of wireless signal characteristics measured in the household.

* * * * *